(12) United States Patent
Yamashita et al.

(10) Patent No.: US 8,881,648 B2
(45) Date of Patent: Nov. 11, 2014

(54) CONCENTRATOR-INTEGRATED SCREW PRESS

(75) Inventors: Manabu Yamashita, Tokyo (JP); Masaharu Miyawaki, Kagawa-ken (JP); Masayoshi Katayama, Kagawa-ken (JP)

(73) Assignee: Ishigaki Company Limited, Tokyo (JP)

( * ) Notice: Subject to any disclaimer, the term of this patent is extended or adjusted under 35 U.S.C. 154(b) by 539 days.

(21) Appl. No.: 13/202,362

(22) PCT Filed: Feb. 1, 2010

(86) PCT No.: PCT/JP2010/051346
§ 371 (c)(1),
(2), (4) Date: Aug. 19, 2011

(87) PCT Pub. No.: WO2010/106838
PCT Pub. Date: Sep. 23, 2010

(65) Prior Publication Data
US 2011/0297016 A1    Dec. 8, 2011

(30) Foreign Application Priority Data

Mar. 19, 2009 (JP) ................................. 2009-067380
Sep. 30, 2009 (JP) ................................. 2009-226833

(51) Int. Cl.
*B30B 3/00* (2006.01)
*C02F 11/12* (2006.01)
*B30B 9/14* (2006.01)
*B01D 29/35* (2006.01)
*B30B 9/16* (2006.01)
*C02F 11/14* (2006.01)
*B30B 9/18* (2006.01)

(52) U.S. Cl.
CPC .............. *C02F 11/125* (2013.01); *B01D 29/35* (2013.01); *B30B 9/163* (2013.01); *C02F 11/14* (2013.01); *B30B 9/18* (2013.01)
USPC ........................ 100/117; 100/145; 210/413

(58) Field of Classification Search
USPC ......... 100/117, 145, 146, 147, 148, 149, 150; 210/248, 402, 413, 414, 415, 673
See application file for complete search history.

(56) References Cited

U.S. PATENT DOCUMENTS 4,336,141 A * 6/1982 Santora .......................... 210/694
4,341,639 A * 7/1982 Santora .......................... 210/673
(Continued)

FOREIGN PATENT DOCUMENTS

| CN | 101250019 | 8/2008 |
| JP | 07-068300 | 3/1995 |

(Continued)

OTHER PUBLICATIONS

China Office action, mail date is Jan. 4, 2013.
(Continued)

*Primary Examiner* — Jimmy T Nguyen
(74) *Attorney, Agent, or Firm* — Greenblum & Bernstein, P.L.C.

(57) ABSTRACT

A concentrator-integrated screw press includes: a continuous concentrator configured to continuously concentrate sludge and discharge the sludge as concentrated sludge, and including a discharge amount equalization unit configured to equalize an amount of concentrated sludge to be discharged per unit time; a positive displacement pump installed consecutively to the concentrator, and configured to continuously transport the concentrated sludge discharged from the concentrator; and a screw press installed consecutively to a discharge side of the positive displacement pump, and configured to compress and dewater the concentrated sludge.

13 Claims, 20 Drawing Sheets

(56) References Cited

U.S. PATENT DOCUMENTS

| | | |
|---|---|---|
| 4,997,578 A | 3/1991 | Berggren |
| 2007/0029245 A1 | 2/2007 | Kuhn et al. |

FOREIGN PATENT DOCUMENTS

| | | |
|---|---|---|
| JP | 60-048199 | 3/1995 |
| JP | 11-216596 | 8/1999 |
| JP | 2003-175400 | 6/2003 |
| JP | 2003-225516 | 8/2003 |
| JP | 2004-17014 | 1/2004 |
| JP | 2004-530553 | 10/2004 |
| JP | 2005-034774 | 2/2005 |
| JP | 3680994 | 8/2005 |
| JP | 2005-270806 | 10/2005 |
| JP | 3797551 | 7/2006 |
| WO | 88/06090 | 8/1988 |
| WO | 03/000603 | 1/2003 |

OTHER PUBLICATIONS

Search report from E.P.O., mail date is Feb. 11, 2013.
Japan Office action, dated Jun. 11, 2013 along with an english translation thereof.

\* cited by examiner

FIG. 11
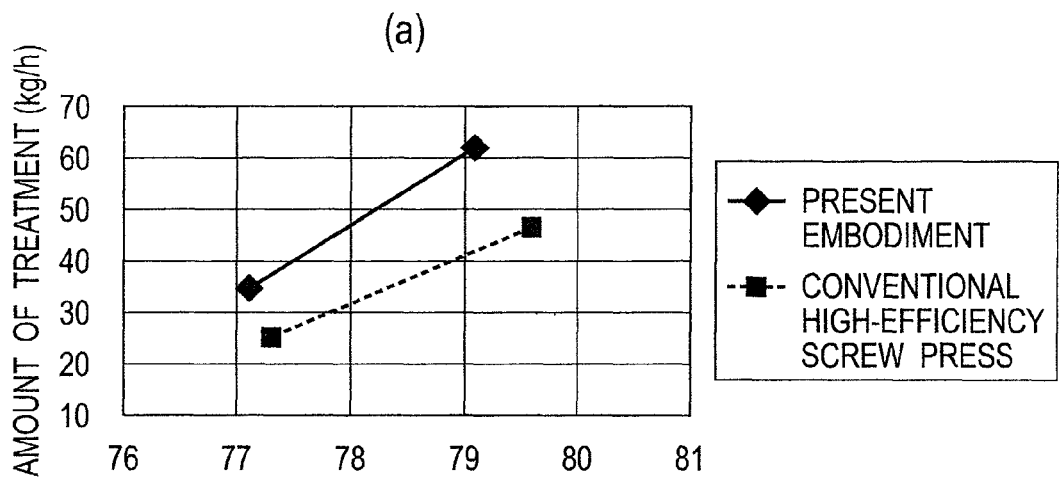
(a)
WATER CONTENT OF CAKE (%W.B.)
GRAVITATIONALLY-CONCENTRATED
DIGESTIVE SLUDGE
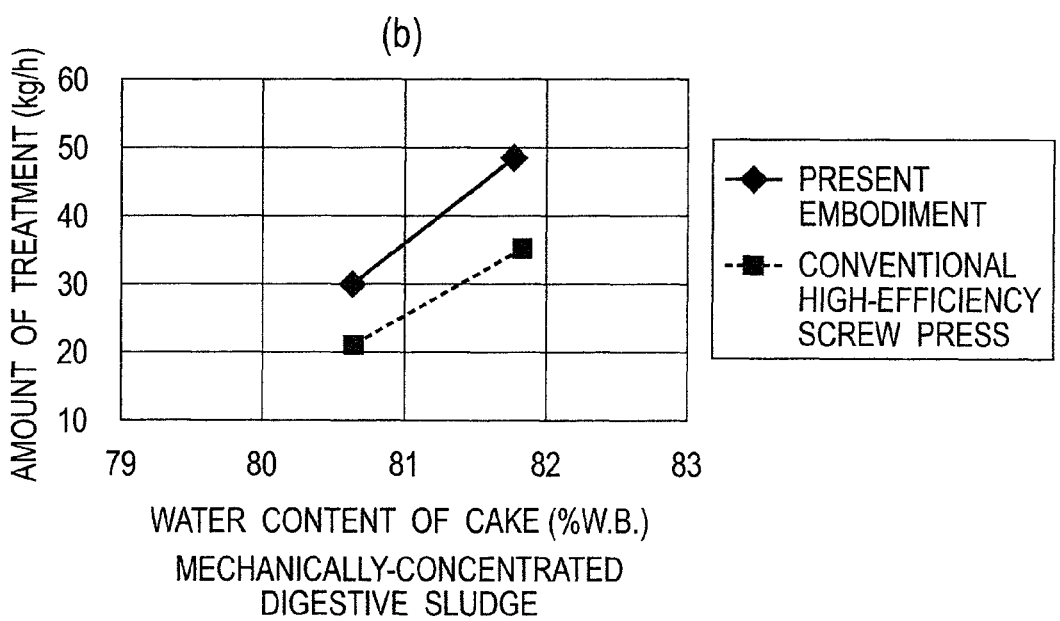
(b)
WATER CONTENT OF CAKE (%W.B.)
MECHANICALLY-CONCENTRATED
DIGESTIVE SLUDGE

US 8,881,648 B2

CONCENTRATOR-INTEGRATED SCREW PRESS

TECHNICAL FIELD

The present invention relates to a concentrator-integrated screw press including: a concentrator configured to concentrate sludge produced by facilities for treating sewage, human excrement, rural drainage, and waste water of factories and the like; and a screw press configured to compress and dewater the concentrated sludge.

BACKGROUND ART

The dewatering of sludge having a high water content and a high fluidity, such as sewage sludge, requires water to be removed from the sludge beforehand to obtain concentrated sludge having a low fluidity. In particular, in the case of compressing and dewatering of the sludge by a screw press, concentrated sludge obtained by a concentrator is accumulated in a storage tank once; and the sludge taken out of the storage tank is flocculated by adding a flocculant thereto and thereafter is dewatered by the screw press.

Japanese Patent No. 3797551 discloses a rotary concentrator configured to concentrate sludge for the purpose of increasing the dewatering efficiency of a screw press.

Japanese Patent No. 3680994 discloses a method of processing sewage sludge, which includes the steps of accumulating sludge concentrated by a rotary concentrator in a storage tank once and then injecting the concentrated sludge taken out of the storage tank into a screw press.

SUMMARY OF INVENTION

Technical Problem

The method of performing the dewatering after once accumulating concentrated sludge in a storage tank and again flocculating the sludge taken out of the storage tank by adding a flocculant sometimes leaves the concentrated sludge in the storage tank for a long time in the case where the continuity of the treatment process decreases, such as in the case where the treatments in the respective steps, inclusive of a concentration step, a flocculation and conditioning step, a dewatering step, are not performed in a consistent manner due to various factors. This method poses a problem that the efficiency of the dewatering by the screw press decreases when the concentrated sludge is left for a long time, because of progress in decomposition of the concentrated sludge and a resultant decrease in the dewaterability of the concentrated sludge.

The present invention has been made in view of the aforementioned problem, and aims to provide a space-saving concentrator-integrated screw press capable of achieving a high dewatering efficiency by increasing the continuity between the concentrating of sludge by a concentrator and the compressing and dewatering of the sludge by a screw press.

Solution to Problem

An aspect of the present invention is a concentrator-integrated screw press including: a continuous concentrator configured to continuously concentrate sludge and discharge the sludge as concentrated sludge, and including a discharge amount equalization unit configured to equalize an amount of concentrated sludge to be discharged per unit time; a positive displacement pump installed consecutively to the concentrator, and configured to continuously transport the concentrated sludge discharged from the concentrator; and a screw press installed consecutively to a discharge side of the positive displacement pump, and configured to compress and dewater the concentrated sludge.

BRIEF DESCRIPTION OF DRAWINGS

FIG. 11 is a graph showing the result of a performance test of the concentrator-integrated screw press of the first embodiment.

DESCRIPTION OF EMBODIMENTS

Figure 1:
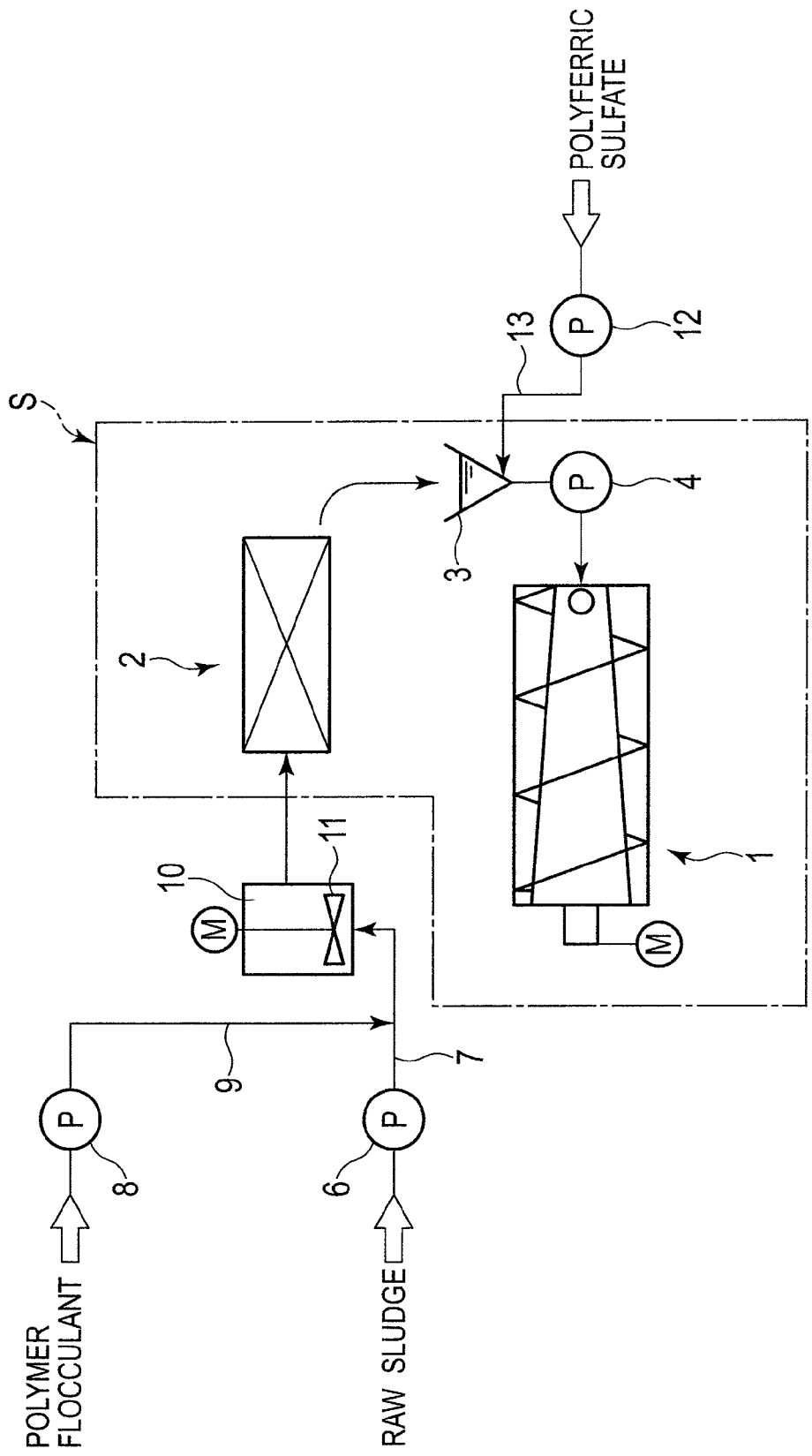
FIG. 1 is a flowchart of a sludge treatment process in which sludge is concentrated and then is compressed and dewatered by a concentrator-integrated screw press of an embodiment of the present invention.

Hereinafter, referring to the drawings, descriptions will be provided for preferred embodiments of the present invention. The technical scope of the present invention should be determined on the basis of the claims, and is not only limited to the embodiments below. Note that the same or similar elements will be denoted by the same or similar reference signs while the drawings are described, and duplicated descriptions are omitted.

FIG. 1 is a flowchart of a sludge treatment process in which sludge is concentrated and then is compressed and dewatered using a concentrator-integrated screw press S of an embodiment of the present invention. A sludge supply pump 6 configured to supply raw sludge is connected to a flocculation system 10 through a sludge supply pipe 7. A chemical supply pipe 9 from a chemical supply pump 8 is connected to the sludge supply pipe 7. A continuous concentrator 2 configured to continuously concentrate sludge and discharge the sludge as concentrated sludge is disposed at the downstream of the flocculation system 10. An injection pump 4 configured to continuously transport the concentrated sludge discharged from the concentrator is installed consecutively to a discharge portion of the concentrator 2. A polyferric sulfate supply pipe 13 from a polyferric sulfate supply pump 12 is connected to a lower sidewall of a chute 3 connected to the injection pump 4. This connection constitutes a configuration in which an inorganic flocculant such as polyferric sulfate can be added to the concentrated sludge discharged from the concentrator 2. A screw press 1 configured to compress and dewater the concentrated sludge is connected to a discharge portion of the injection pump 4. The concentrator-integrated screw press S of the embodiment of the present invention includes the concentrator 2, the chute 3, the injection pump 4 and the screw press 1.

In the sludge treatment process by the aforementioned concentrator-integrated screw press S, a polymer flocculant supplied from the chemical supply pump 8 is added to the raw sludge such as sewage sludge supplied from the sludge supply pump 6; the raw sludge and the polymer flocculant are stirred and mixed by a mixer 11 of the flocculation system 10. Thus, flocculated flocs are formed. The flocculated and conditioned sludge is supplied to the concentrator 2, in which concentrated sludge having a low fluidity is obtained by removing water from the sludge having a high water content and a high fluidity. The concentrated sludge discharged from the concentrator 2 is received by the chute 3, and is then supplied to the injection pump 4. An inorganic flocculant such as polyferric sulfate supplied from the polyferric sulfate supply pump 12 is added to the concentrated sludge on the suction side of the injection pump 4. Then, the added inorganic flocculant and the concentrated sludge are kneaded together by the injection pump 4 to form a strongly flocculated floc. Thereafter, the resultant concentrated sludge is injected into the screw press 1, and then is compressed and dewatered.

Note that the broken flock may be reflocculated by adding a polymer flocculant, instead of the inorganic flocculant, to the concentrated sludge to be supplied to the screw press 1.

First Embodiment

Figure 2:
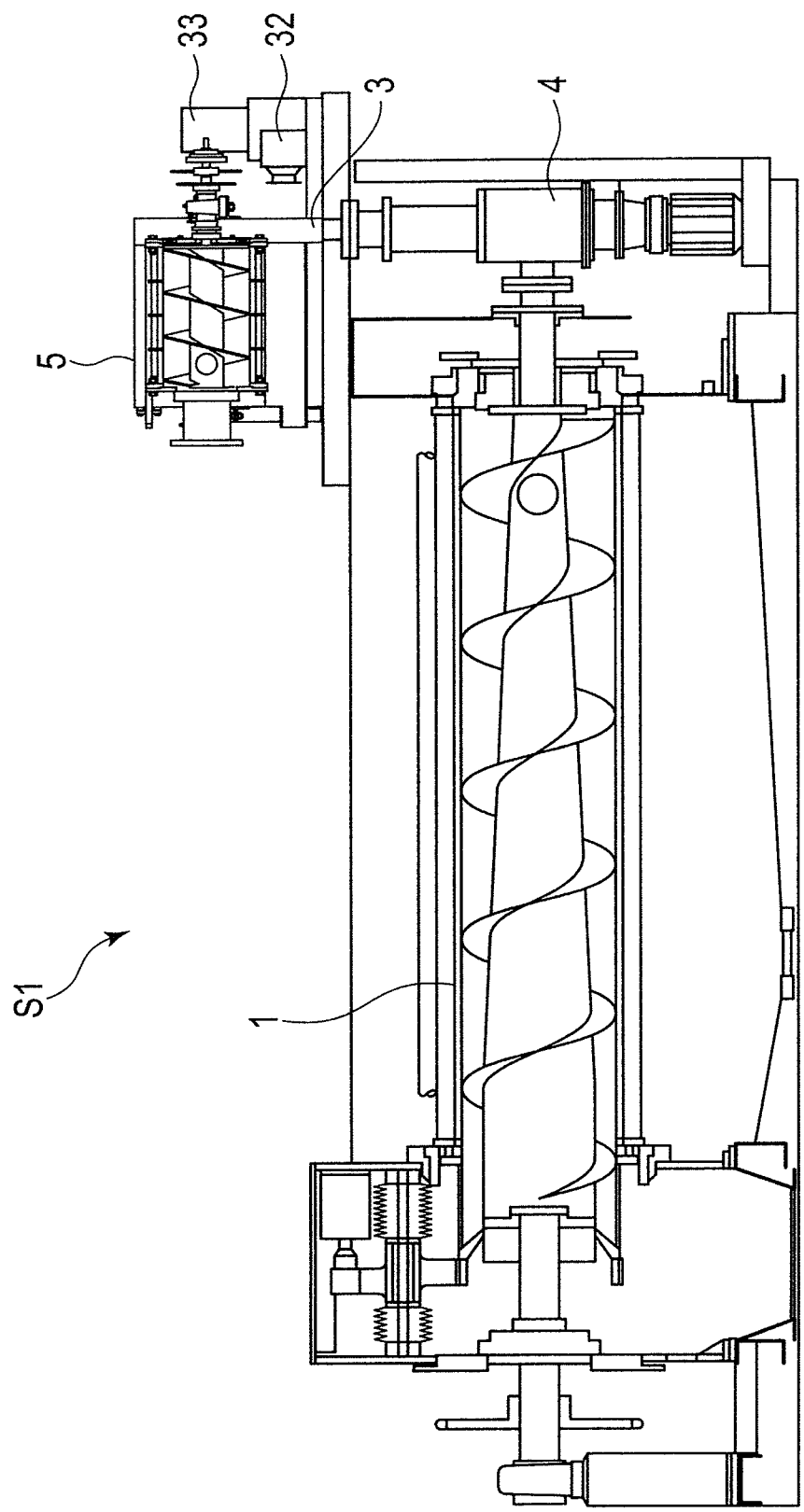
FIG. 2 is a vertical cross-sectional side view of a concentrator-integrated screw press of a first embodiment.

FIG. 2 is a vertical cross-sectional side view of a concentrator-integrated screw press S1 of a first embodiment of the present invention. The concentrator-integrated screw press S1 employs a rotary concentrator 5 in lieu of the concentrator 2 of the aforementioned concentrator-integrated screw press S. To put it more specifically, the concentrator-integrated screw press S1 includes: the screw press 1; the rotary concentrator 5 installed on the screw press 1; the chute 3 connected to a discharge portion of the rotary concentrator 5, and configured to receive concentrated sludge discharged from the rotary concentrator 5; and the injection pump 4 vertically installed next to a starting end portion of the screw press 1, and configured to inject the concentrated sludge received by the chute 3 into the screw press 1. The chute 3 is connected to the suction side of the injection pump 4, and the screw press 1 is connected to the discharge side of the injection pump 4.

Figure 3:
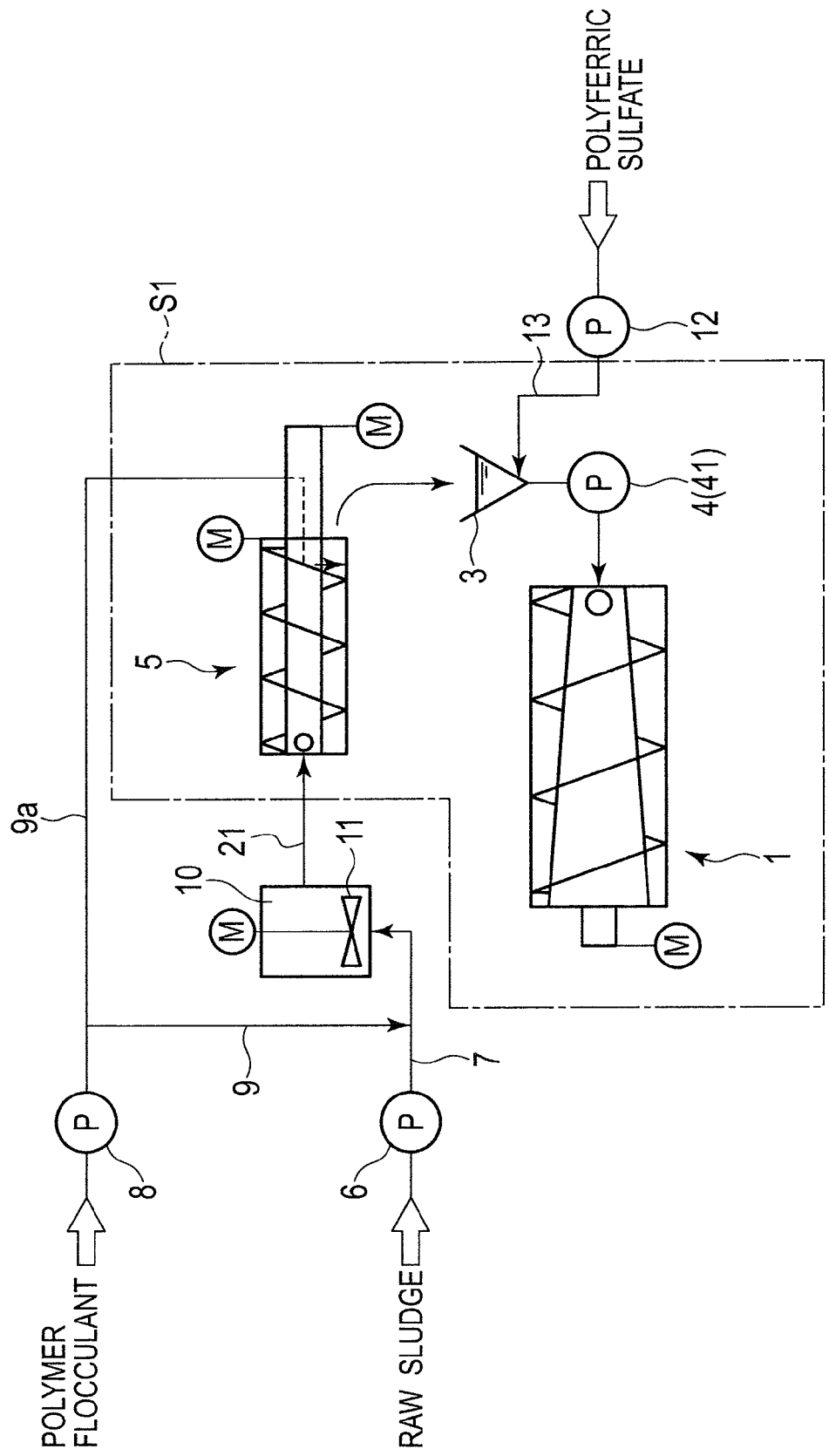
FIG. 3 is a flowchart of a sludge treatment process in which sludge is concentrated and then is compressed and dewatered using the concentrator-integrated screw press of the first embodiment.

FIG. 3 is a flowchart of a sludge treatment process in which sludge is concentrated and then is compressed and dewatered using the concentrator-integrated screw press of the first embodiment, and corresponds to the flowchart shown in FIG. 1 in which the concentrator-integrated screw press S is replaced with the aforementioned concentrator-integrated screw press S1. In the concentrator-integrated screw press S1, a chemical supply pipe 9a branching off from the chemical supply pipe 9 is connected to a discharge side of the rotary concentrator 5. In addition, the rotary concentrator 5 is configured to: add a polymer flocculant supplied from the chemical supply pipe 9a to the concentrated sludge from which water has been removed; thus perform secondary flocculation on the flocs which have been broken during the concentration step; and thereafter continuously discharge the concentrated sludge.

Figure 4:
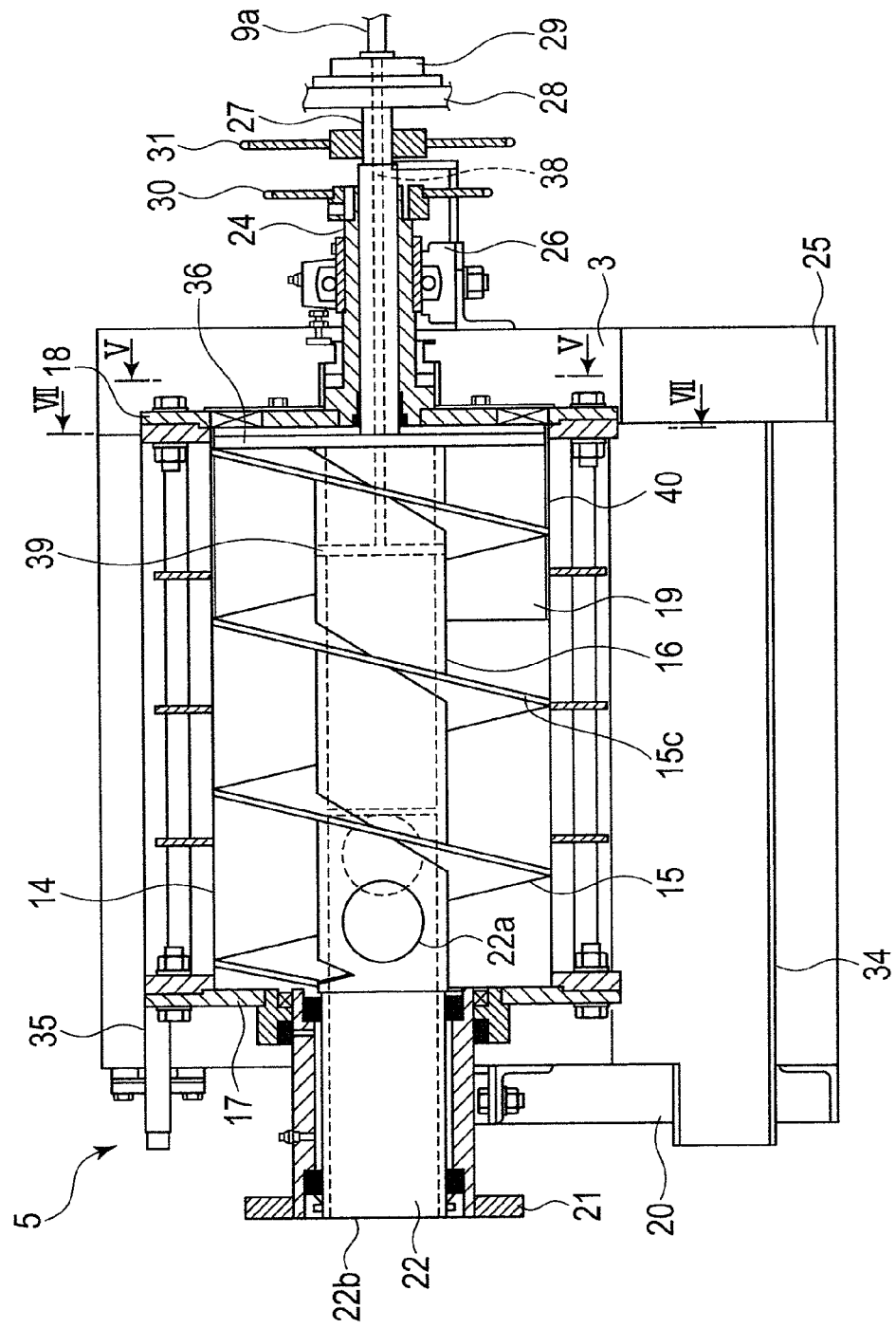
FIG. 4 is a vertical cross-sectional view of a rotary concentrator of the first embodiment.

FIG. 4 is a vertical cross-sectional view of the rotary concentrator 5. The rotary concentrator 5 includes: an outer cylinder screen 14 having a substantially horizontal center axis; a screw shaft 16 which is concentrically disposed in the outer cylinder screen 14, which is configured to rotate about the center axis of the outer cylinder screen 14, and around which a screw blade 15 is wound spirally; and an inlet outer cylinder flange 17 and an outlet outer cylinder flange 18 each of which has a disk shape, and which are fitted to an inlet side end portion and an outlet side end portion of the outer cylinder screen 14, respectively. A radially outer end edge 15c of the screw blade 15 is in sliding contact with an inner periphery of the outer cylinder screen 14. A concentrating compartment 19 spirally partitioned by the screw blade 15 is formed between the inner periphery of the outer cylinder screen 14 and an outer periphery of the screw shaft 16.

An inlet side end portion of the screw shaft 16 is pivotally and rotatably supported by a sludge supply pipe 21 which is suspended and supported by a front frame 20. In addition, the inlet outer cylinder flange 17 of the outer cylinder screen 14 is pivotally and rotatably supported by the sludge supply pipe 21.

A sludge supply passage 22 communicating with the concentrating compartment 19 and the sludge supply pipe 21 is formed inside the screw shaft 16. As multiple supply ports 22a provided in the outer periphery of the screw shaft 16, one end of the sludge supply passage 22 is opened to the concentrating compartment 19. The other end of the sludge supply passage 22 is configured to be an opening 22b opened toward the inlet end side of the screw shaft 16. The flocculated and conditioned sludge supplied from the flocculation system 10 is supplied to the starting end side (left side on FIG. 4) of the concentrating compartment 19 via the sludge supply pipe 21 and the sludge supply passage 22.

Figure 5:
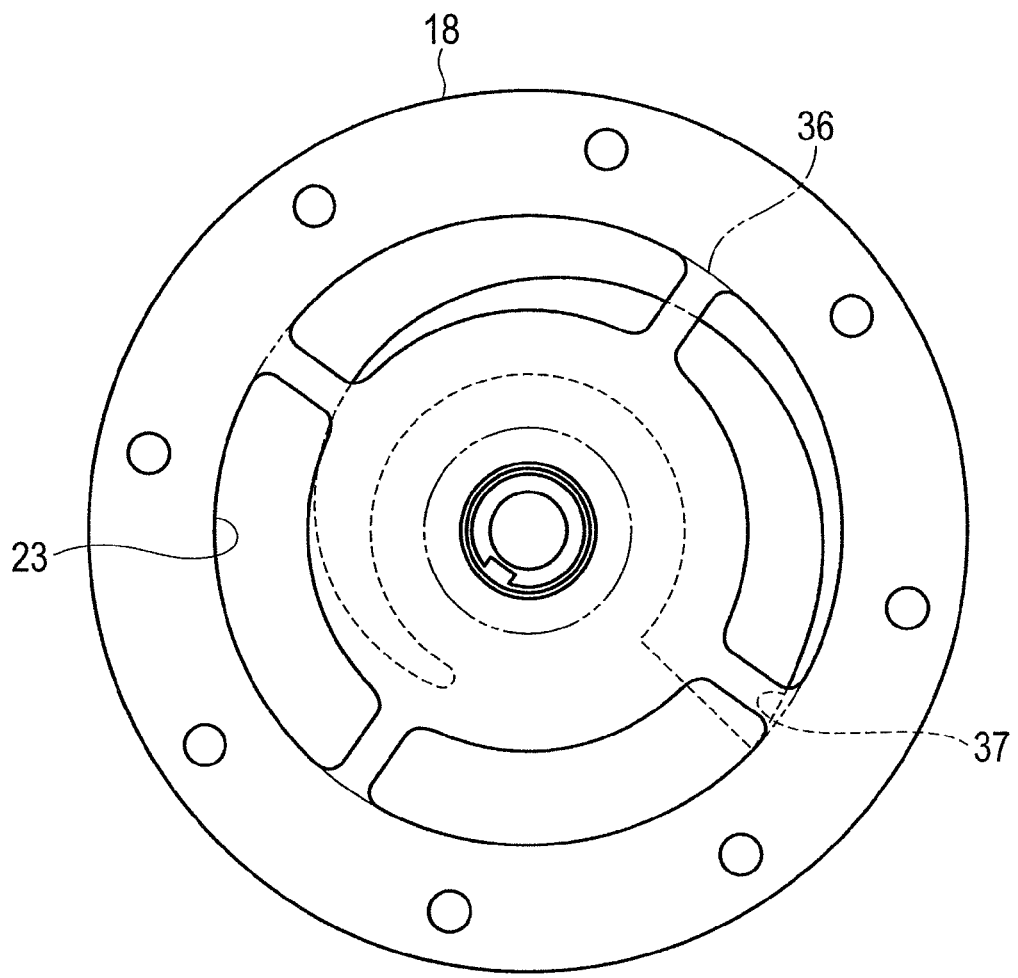
FIG. 5 is a fragmentary view in the direction of the arrow V in FIG. 4, and is a front view of an outlet outer cylinder flange fitted to the rotary concentrator of the first embodiment.

FIG. 5 is a fragmentary view in the direction of the arrow V in FIG. 4, and is a front view of the outlet outer cylinder flange 18 fitted to the outer cylinder screen 14. Multiple discharge ports 23 for discharging the concentrated sludge concentrated in the concentrating compartment 19 to the chute 3 are provided to the outlet outer cylinder flange 18 in the circumferential direction. Each of the discharge ports 23 has a shape extending in the circumferential direction, and the radially outer opening edge of the discharge port 23 extends along the inner periphery of the outer cylinder screen 14.

In addition, as shown in FIG. 4, an outer cylinder drive shaft 24 is connected to the outlet outer cylinder flange 18 of the outer cylinder screen 14. The outer cylinder drive shaft 24 is pivotally supported by a bearing 26 which is suspended and supported by a rear frame 25. A screw drive shaft 27 is connected to a rear end portion of the screw shaft 16. The screw drive shaft 27 is inserted in the outer cylinder drive shaft 24. A leading end portion of the screw drive shaft 27 is pivotally supported by a bearing 29 of a mount 28 provided to the rear frame 25. Sprockets 30 and 31 are respectively fitted to the outer cylinder drive shaft 24 of the outer cylinder screen 14 and the screw drive shaft 27 of the screw shaft 16, and are configured to rotate the outer cylinder screen 14 and the screw shaft 16 at differential speeds in opposite directions by drive mechanisms 32, 33 shown in FIG. 2. The outer cylinder screen 14 and the screw shaft 16 may be rotated at differential speeds in the same direction. However, if the outer cylinder screen 14 and the screw shaft 16 are rotated in opposite directions, the number of rotations of the screw blade 15 relative to the outer cylinder screen 14 can be increased, and the number of times (frequency) the radially outer end edge 15c of the screw blade 15 is brought into sliding contact with the inner surface of the screen face of the outer cylinder screen 14 can be increased. Thus, the filtering surface that is likely to clog can be efficiently renewed, and discharge of the filtrate is accelerated. Accordingly, a large amount of sludge having a low concentration can be processed. Note that, depending on the liquid concentrate to be concentrated, the filtering surface may be cleaned with the outer cylinder screen 14 and the screw shaft 16 rotated at their respective differential speeds at the point when the filtering surface of the outer cylinder screen 14 clogs. A filtrate reception storage tank 34 configured to receive the separated and discharged filtrate is disposed under the outer cylinder screen 14. Supply of a part of the filtrate, which is discharged to the filtrate reception storage tank 34, into the chute 3 prevents production of a bridge of the concentrated sludge in the chute 3, and accordingly makes it possible to smoothly supply the concentrated sludge into the injection pump 4. A cleaning pipe 35 is disposed around the outer cylinder screen 14 along the outer cylinder screen 14. The cleaning pipe 35 is configured to solve the clogging of the filtering surface by spraying a cleaning fluid to the outer cylinder screen 14 while the outer cylinder screen 14 is caused to rotate.

As shown in FIG. 4, a shuttering board 36 having a circular disk shape is fitted to the screw shaft 16 at the terminal end portion of the concentrating compartment 19, and is configured to rotate together with the screw shaft 16 (to rotate in synchronization). The shuttering board 36 is provided near the outlet outer cylinder flange 18 of the outer cylinder screen 14 substantially in parallel therewith. An outer peripheral edge 36b of the shuttering board 36 is in sliding contact with the inner surface of a circular cylinder 40 of the outer cylinder screen 14, which is to be described later.

Figure 6:
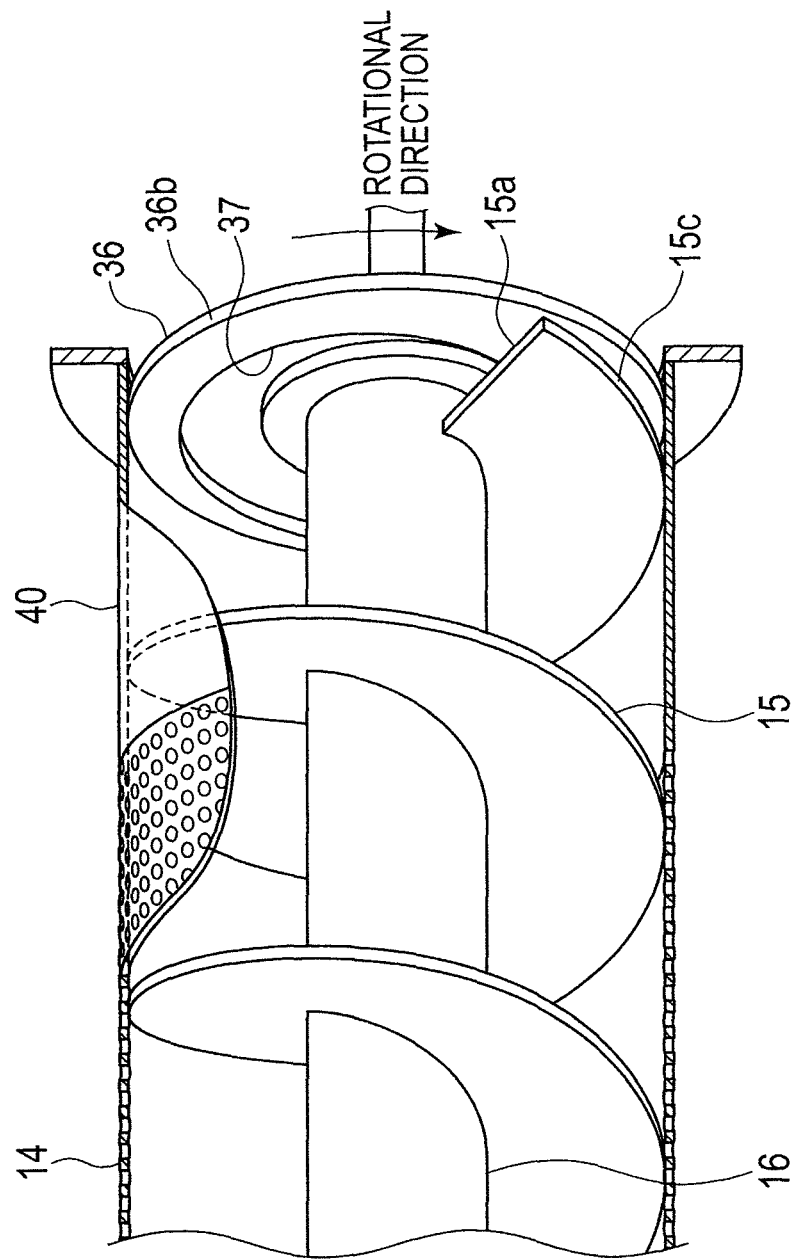
FIG. 6 is a perspective view of a rear end portion of a concentrating compartment of the rotary concentrator of the first embodiment.
Figure 7:
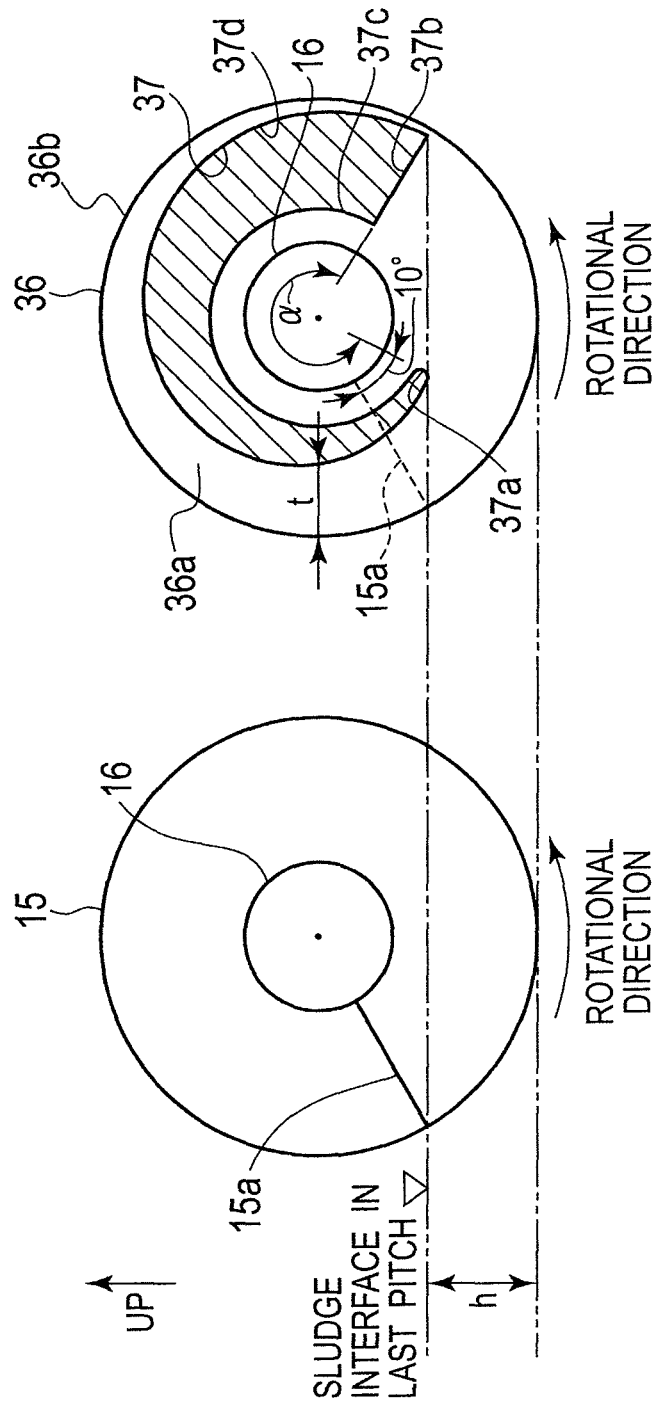
FIG. 7 is a conceptual diagram showing a positional relationship between a terminal edge of a screw blade and a spiral opening formed in a shuttering board in the rotary concentrator of the first embodiment, and is a fragmentary view taken in the direction of the arrow VII in FIG. 4.

FIG. 6 is a perspective view of a rear end portion of the concentrating compartment. A spiral-shaped opening 37 is formed in the shuttering board 36. FIG. 7 is a conceptual diagram showing the positional relationship between the terminal edge 15a of the screw blade and the spiral-shaped opening 37 formed in the shuttering board 36, and corresponds to a fragmentary view of the screw shaft 16 in the direction of the arrow VII in FIG. 4. A shuttering 36a formed in a radially outer portion of the shuttering board 36, which is outside the opening 37, is formed in such a way that its height t (the width of the shuttering 36a from its radially outer peripheral edge portion of the shuttering 36a to its radial inner opening peripheral edge portion) should gradually decrease toward the rear in the rotation direction (clockwise in FIG. 7) at a substantially constant decreasing rate in a predetermined angular range α in the rotation direction, the range α starting at the terminal edge 15a of the screw blade 15. To put it differently, in the opening 37 of the shuttering board 36, an radially outer opening edge 37d gradually comes closer to the outer peripheral edge 36b of the shuttering board 36 toward the rear in the rotation direction in the predetermined angular range α in the rotation direction of the screw shaft 16, the range α starting at the terminal edge 15a of the screw blade 15. In addition, the aperture of the opening 37 gradually increases toward the rear in the rotation direction at a substantially constant increasing rate. The aperture means the width in the radial direction from a radial inner opening edge 37c of the opening 37 to the radially outer opening edge 37d thereof. In this embodiment, a starting end portion 37a of the opening 37 is provided at a position of approximately 10 degrees forward from the terminal edge 15a of the screw blade 15 in the rotation direction, and a terminal end portion 37b of the opening 37 is provided at a position of approximately 270 degrees backward from the terminal edge 15a in the rotation direction. In addition, the shuttering 36a is formed in the angular range of approximately 280 degrees in the rotation direction, the range starting at the terminal edge 15a. Then, the height t of the shuttering 36a is gradually decreased toward the rear in the rotation direction, and the aperture of the opening 37 is gradually increased toward the rear in the rotation direction in this angular range.

The shuttering board 36 and the spiral-shaped opening 37 rotate together with the screw shaft 16. Because the opening 37 is formed in such a way that the height t of the shuttering 36a should gradually decrease toward the rear in the rotation direction at a substantially constant decreasing rate, in a case where the screw shaft 16 rotates at a constant speed in the rotation direction, a height h of the lowest point of the opening 37 decreases at a substantially constant decreasing rate with the rotation of the screw shaft 16. In this respect, because the concentrated sludge in the last pitch of the screw blade 15 in the concentrating compartment 19 is eventually discharged after overflowing the shuttering 36a, the amount of concentrated sludge to be discharged per unit time (hereinafter, simply referred to as a "discharge amount") changes in accordance with the decreasing rate of the height h of the lowest point of the opening 37. In this embodiment, while the screw shaft 16 rotates approximately 330 degrees in the rotation direction from the state shown in FIG. 7, the height h decreases at the substantially constant decreasing rate with the rotation of the screw shaft 16. Thus, the discharge amount of concentrated sludge becomes substantially constant. Accordingly, pulsation in which the discharge amount of concentrated sludge drastically increases and decreases per cycle is prevented, and the discharge amount of concentrated sludge is equalized.

Conventionally, the concentrated sludge in the last pitch of the screw blade 15 is discharged intermittently or interruptedly every time the screw blade 15 makes one turn. To put it more specifically, if, for example the terminal edge 15a of the screw blade 15 and the concentrated sludge are in the positional relationship shown in the left part of FIG. 7, the concentrated sludge in the last pitch of the screw blade 15 is almost completely discharged while the terminal edge 15a moves from this point to the position immediately below the rotation axis of the screw shaft 16, i.e., while the screw shaft 16 rotates approximately 50 degrees in the rotation direction; and thereafter, the discharge of concentrated sludge stops until the terminal edge 15a of the screw blade 15 returns to the original position in conjunction with the rotation of the screw shaft 16 rotates. On the other hand, the rotary concentrator 5 of the present embodiment discharges the concentrated sludge at a substantially constant flow rate from the beginning through the end of the one cycle by adjusting and controlling the amount of concentrated sludge overflowing the shuttering 36a by use of the opening 37 of the shuttering board 36 configured to rotate together with the screw shaft 16. The concentrated sludge overflowing the shuttering 36a flows out from the discharge ports 23 of the outlet outer cylinder flange 18, and then is discharged to the chute 3 supported by the rear frame 25.

Figure 8:
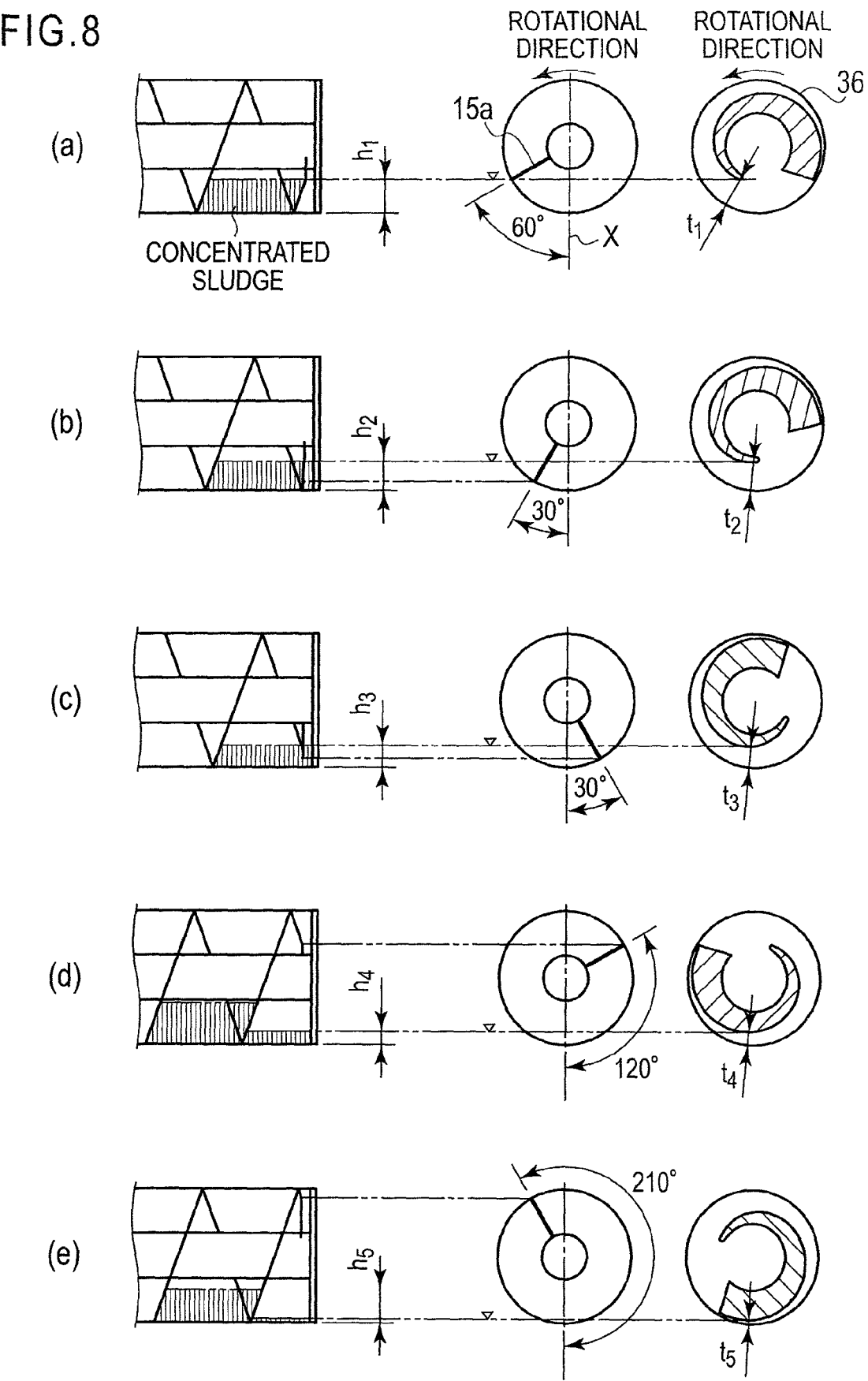
FIG. 8 is a conceptual diagram showing how the relationship between the positions of the terminal edge of the screw blade and the spiral-shaped opening formed in the shuttering board and the position of a sludge interface of concentrated sludge remaining in the last pitch of the screw blade of the concentrating compartment changes with rotation of a screw shaft.

FIG. 8 is a conceptual diagram showing how the relationship between the positions of the terminal edge 15a of the screw blade 15 and the spiral-shaped opening 37 formed in the shuttering board 36 and the position of a sludge interface of the concentrated sludge remaining in the last pitch of the screw blade 15 of the concentrating compartment 19 changes with rotation of the screw shaft 16.

Part (a) of FIG. 8 shows a state where the terminal edge 15a of the screw blade 15 is situated backward from the vertical line X in the rotation direction by approximately 60 degrees. At this point, no part of the sludge in the last pitch of the screw blade 15 has been discharged yet, and the height of the interface of the sludge takes the largest value h1. The discharge of concentrated sludge on the discharge side beyond the last pitch of the screw blade 15 has already ended, and the terminal end portion 37b of the opening 37 provided to the shuttering board 36 has already moves in a way that the terminal end portion 37b goes away from the interface of the sludge.

Part (b) of FIG. 8 shows a state where the screw shaft 16 and the shuttering board 36 have rotated approximately 30 degrees from the state shown in Part (a) thereof. The terminal edge 15a of the screw blade 15 is situated backward from the vertical line X in the rotation direction by approximately 30 degrees. At this point, part of the sludge in the last pitch of the screw blade 15 passes the terminal edge 15a, and flows into the space on the discharge side beyond the last pitch of the screw blade 15. Then, when a height h2 of the interface of the concentrated sludge becomes higher than the height of the shuttering 36a (shuttering height t2) at the starting end portion 37a which is at the lowest point of the opening 37, part of the concentrated sludge overflows the starting end portion 37a.

Part (c) of FIG. 8 shows a state where the screw shaft 16 and the shuttering board 36 have further rotated approximately 60 degrees from the state shown in Part (b) thereof. The terminal edge 15a of the screw blade 15 is situated forward from the vertical line X in the rotation direction by approximately 30 degrees. At this time, when a height h3 of the interface of the concentrated sludge becomes higher than the height of the shuttering 36a (shuttering height t3) at the lowest point of the opening 37, part of the concentrated sludge overflows the shuttering 36a. The height h3 of the interface of the sludge decreases in conjunction of the overflow.

Part (d) of FIG. 8 shows a state where the screw shaft 16 and the shuttering board 36 have further rotated approximately 90 degrees from the state shown in Part (c) thereof. The terminal edge 15a of the screw blade 15 is situated forward from the vertical line X in the rotation direction by approximately 120 degrees. At this time, when a height h4 of the interface of the concentrated sludge becomes higher than the height of the shuttering 36a (shuttering height t4) at the lowest point of the opening 37, part of the concentrated sludge overflows shuttering 36a. The height h4 of the interface of the sludge decreases in conjunction of the overflow.

Part (e) of FIG. 8 shows a state where the screw shaft 16 and the shuttering board 36 have further rotated approximately 90 degrees from the state shown in Part (d) thereof. The terminal edge 15a of the screw blade 15 is situated backward from the vertical line X in the rotation direction by approximately 210 degrees. At this time, the rest of the concentrated sludge is discharged from the terminal end portion 37b (with a shuttering height t5) which is at the lowest point of the opening 37, and the height of the interface of the sludge thus becomes h5. Because the shuttering board 36 rotating in synchronization with the screw shaft 16 is configured in such a way that the height of the shuttering should decrease depending on the angle from the terminal edge 15a of the screw blade 15, the concentrated sludge can be discharged at a constant flow rate.

In addition, as shown in FIG. 4, a chemical supply pipe 38 for supplying a flocculant for secondary flocculation to the terminal end portion of the concentrating compartment 19 is provided in the rear end portion of the screw shaft 16 and an inside of the screw drive shaft 27. One end of the chemical supply pipe 38 is connected to the chemical supply pipe 9a, and the other end thereof is formed to have multiple nozzle holes 39, which are opened toward the termination end portion of the concentrating compartment 19, in the outer peripheral surface of the rear end portion of the screw shaft 16. In addition, as shown in FIG. 4 and FIG. 6, an impermeable annular cylinder 40 is consecutively installed in an area corresponding to the last pitch of the screw blade 15 of the outer cylinder screen 14. The secondary flocculation of concentrated sludge is performed by: supplying an inorganic flocculant from the nozzle holes 39 to the concentrated sludge in the circular cylinder 40; and then mixing the inorganic flocculant and the concentrated sludge by use of the screw blade 15 while the inorganic flocculant and the concentrated sludge are rotated along the inner peripheral surface of the annular cylinder 40. Since the flocculant is added through the nozzle holes 39 provided in the outer peripheral surface of the rear end portion of the screw shaft 16, the mixing properties of the flocculant component increases in the annular cylinder 40. Thus, the secondary flocculation of the flocs broken during the concentration step in the concentrating compartment 19 can be efficiently performed. If the concentrated sludge that has been subjected to the secondary flocculation is injected into the screw press 1, the efficiency of the compression dewatering by the screw press 1 improves.

Figure 9:
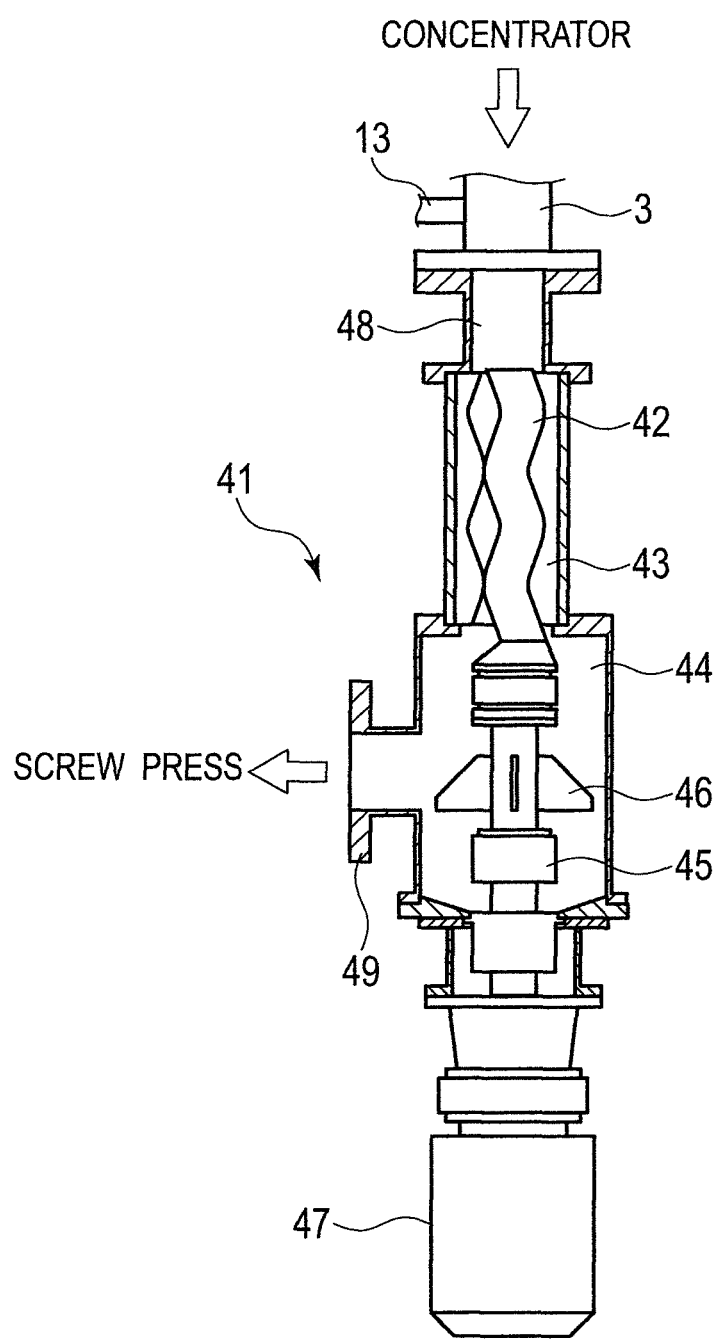
FIG. 9 is a vertical cross-sectional view of a uniaxial screw pump serving as an injection pump of the first embodiment.

FIG. 9 is a vertical cross-sectional view of a uniaxial screw pump 41 serving as the injection pump 4. The uniaxial screw pump 41 functions as the injection pump 4 configured to inject the concentrated sludge discharged from the rotary concentrator 5 into the screw press 1. The uniaxial screw pump 41 includes: a rotor 42; a casing 43 in which the rotor 42 is installed; an injection chamber 44 formed by expanding the lower end side portion of the casing 43; and a drive unit 47 installed consecutively to the lower end of the injection chamber 44. The injection chamber 44 is expanded, and a drive shaft 45 of the drive unit 47 is extendedly installed therein. The upper end of the drive shaft 45 is connected to the rotor 42. In addition, multiple mixing impellers 46 protruding in the radial direction are fixedly attached to the drive shaft 45. The chute 3 configured to receive the concentrated sludge discharged from the rotary concentrator 5 is connected to a suction port 48 opened toward the upper end of the casing 43. The polyferric sulfate supply pipe 13 of the polyferric sulfate supply pump 12 is connected to the chute 3. An inorganic flocculant such as polyferric sulfate is added to the concentrated sludge discharged from the rotary concentrator 5 through the polyferric sulfate supply pipe 13, and the added inorganic flocculant is mixed and kneaded with the concentrated sludge by the rotor 42 and the mixing impellers 46. Thus, the concentrated sludge can be injected into the screw press 1 without any pulsation while strongly and homogeneously flocculated flocs are formed in the concentrated sludge.

A discharge port 49 opened in a horizontal direction is provided to the sidewall of the injection chamber 44. A supply passage 58 of the screw press 1 is connected to the discharge port 49 so that the concentrated sludge in which the strong and homogeneous flocs are formed can be injected into the screw press 1. Note that a scheme may be employed in which: multiple discharge ports 49 are formed in the sidewall of the injection chamber 44; and multiple screw presses 1 are connected consecutively to the respective multiple discharge ports 49. This makes it possible to match the amount of sludge to be processed by the rotary concentrator 5 to the total amount of sludge to be processed by the multiple screw presses 1 if the multiple screw presses 1 are connected to the rotary concentrator 5, even in a case where the amount of sludge to be processed by the rotary concentrator 5 is larger than the amount of sludge to be processed by the single screw press 1.

Note that, although this embodiment employs the uniaxial screw pump 41 as the injection pump 4, the injection pump 4 is not limited to this. Various types of pumps may be used as the injection pump 4. In addition to the uniaxial screw pump, positive displacement pumps such as a diaphragm pump, a tubular pump and a piston pump are preferable because such pumps do not break the concentrated sludge discharged from the concentrator. In particular, the uniaxial pump is the most preferable because of its above-described advantages including: its continuous discharge of sludge and equalization of the discharge amount; and its rotary system which enables the flocculant to be added to the transported sludge and mixed with the sludge.

Figure 10:
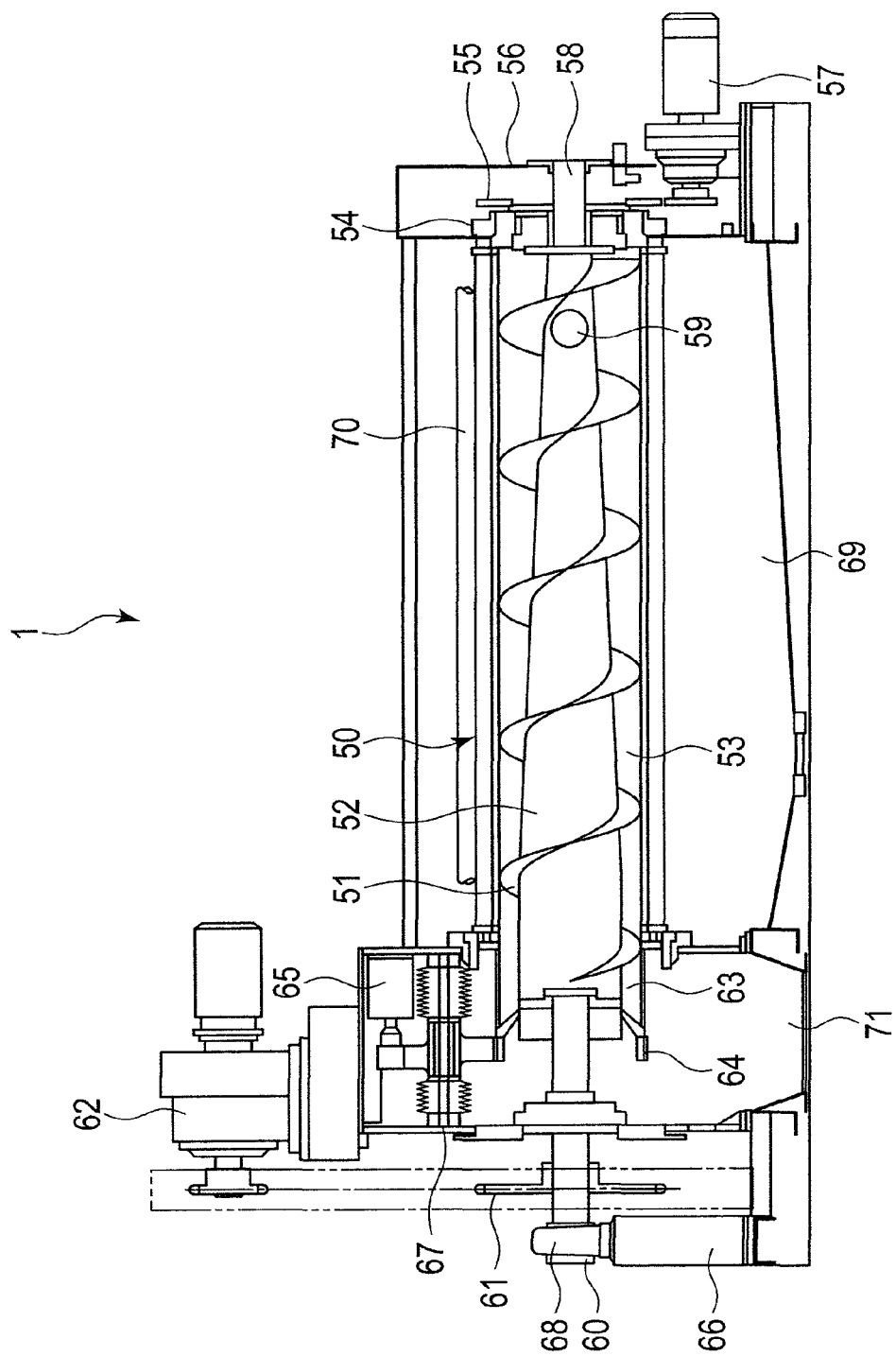
FIG. 10 is a vertical cross-sectional view of a screw press of the first embodiment.

FIG. 10 is a partial vertical cross-sectional side view of the screw press. The screw press 1 includes: a cylindrical outer cylinder screen 50 having a filtering surface on its side surface; and a screw shaft 52 which is configured to rotate in the outer cylinder screen 50, and around which a screw blade 51 is wound spirally. A filtering chamber 53 spirally partitioned by the screw blade 51 is formed between the inner peripheral surface of the outer cylinder screen 50 and the outer peripheral surface of the screw shaft 52. The filtering chamber 53 is reduced in size from the supply side (the right side in FIG. 10) toward the discharge side (the left side in FIG. 10). An inlet flange 54 is fitted to a supply side end portion of the outer cylinder screen 50. A sprocket 55 is fitted to the outside of the inlet flange 54, and the sprocket 55 is interlockingly connected to a forward and reverse rotatable outer cylinder drive 57 installed on a front frame 56. A supply passage 58 for supplying concentrated sludge to the filtering chamber 53 is formed inside a supply side end portion of the screw shaft 52. As multiple supply ports 59 provided in the outer peripheral surface of the screw shaft 52, one end of the supply passage 58 is opened toward a starting end portion of the filtering chamber 53. A screw drive shaft 60 is connected to a discharge side end portion of the screw shaft 52. A sprocket 61 is fitted to the screw drive shaft 60, and a screw drive unit 62 is interlockingly connected to the sprocket 61. A back-pressure adjustment presser 64 is provided facing a discharge port 63 of the filtering chamber 53. A sliding cylinder 65 is connected to the presser 64, and is slidably suspended and supported by a moving shaft 67 disposed on a rear frame 66. The screw drive shaft 60 is pivotally supported by a bearing 68 provided to the rear frame 66. The screw shaft 52 of the screw press 1 is in sliding contact with the discharge port 49 of the uniaxial screw pump 41. Thus, the concentrated sludge in which the flocs are strongly flocculated by addition of the inorganic flocculant is injected into the screw press 1 from the uniaxial screw pump 41. Note that a filtrate reception storage tank 69 is disposed under the outer cylinder screen 50. A cleaning pipe 70 is disposed around the outer cylinder screen 50 along the outer cylinder screen 50. The cleaning pipe 70 is configured to solve the clogging of the filtering surface by spraying a cleaning fluid to the outer cylinder screen 50 while the outer cylinder screen 50 is caused to rotate. A dewatered-sludge cake reception storage tank 71 is provided in the terminal end portion of the screw press 1.

The present embodiment enables the sludge to be compressed and dewatered by the screw press 1 immediately after concentrated by the rotary concentrator 5, since the rotary concentrator 5 is directly connected to the screw press 1 via the uniaxial screw pump 41. The concentrated sludge no longer has to be left in the storage tank for a long time. Accordingly, the phenomenon that the dewatering efficiency decreases due to a progress in the decomposition of sludge does not occur. To put it more specifically, the concentrator-integrated screw press S1 of the present embodiment is capable of improving the dewatering efficiency without causing the decomposition or something similar in the concentrated sludge, because the concentrator-integrated screw press 1 dewaters the sludge immediately after concentrating the sludge as a result of directly connecting the rotary concentrator 5 and the screw press 1 together.

In addition, the concentrator-integrated screw press S1 of the present embodiment further improves the efficiency of the compression dewatering by the screw press 1, because the concentrator-integrated screw press S1 performs the secondary flocculation on the floc, which has been broken during the concentration step, by adding the polymer flocculant to the concentrated sludge in the rotary concentrator 5. Moreover, the concentrator-integrated screw press S1 enables the concentrated sludge to be injected into the screw press 1 without any pulsation while forming strong and homogeneous flocs in the concentrated sludge, because: the concentrator-integrated screw press S1 adds the inorganic flocculant to the concentrated sludge which is discharged from the rotary concentrator 5; and the concentrator-integrated screw press S1 causes the added inorganic flocculant to be mixed and kneaded with the concentrated sludge by the rotor 42 and the mixing impellers 46 of the uniaxial screw pump 41. To put it differently, the concentrator-integrated screw press S1 of the present embodiment is capable of obtaining a dewatered cake having a low water content by efficiently concentrating and dewatering the sludge having a high water content and a high fluidity.

Moreover, the concentrator-integrated screw press S1 of the present embodiment does not need a large installation area for the concentrator, the concentrated sludge storage tank or the dewatering system. Thus, the concentrator-integrated screw press S1 makes the installation area significantly smaller than the installation area needed for a conventional system obtained by combination of a concentrator and a dewatering device, and achieves space-saving. Furthermore, as will be described later, the concentrator-integrated screw press S1 is capable of reducing the volume of the chute 3 configured to receive the concentrated sludge, because the concentrator-integrated screw press S1 is capable of equalizing the discharge amount of concentrated sludge to be discharged from the rotary concentrator 5. Thus, the contractor-integrated screw press S1 is capable of achieving further space-saving.

The rotary concentrator 5 of the present embodiment is small in size and compact as a concentrator, has a small electric motor capacity, and is thus low in power consumption. Moreover, the rotary concentrator 5 can easily adjust the concentration density by controlling the number of rotations of the screw shaft 16. In addition, as compared with conventional continuous dewatering devices such as a belt type dewatering device and a centrifugal dewatering device, the screw press 1 is small in size and compact, has a small electric motor capacity, and is thus low in power consumption. Furthermore, safety operation control of the screw press 1 is easy, and the dewatering efficiency of the screw press 1 is also high. Since the rotary concentrator 5 and the screw press 1 are directly connected to each other, the sludge treatment process becomes more space-saving, more energy-saving, and more efficient.

Moreover, the concentrator-integrated screw press S1 of the present embodiment is formed by integrating: the rotary concentrator 5 including the screw blade 15 for concentration on the substantially horizontal screw shaft 16; and the screw press 1 including the screw blade 51 for compression on the substantially horizontal screw shaft 52. Accordingly, the concentrator-integrated screw press S1 does not cause a problem that sludge containing a solid matter having a large specific gravity is precipitated and deposited near a sludge supply port of the vertical cylinder screen, unlike in the case where a horizontal cylinder screen including a screw blade for compression on a horizontal screw shaft and a vertical cylinder screen including a screw blade for transportation on a vertical screw shaft are consecutively connected to each other.

Furthermore, the rotary concentrator 5 of the present embodiment includes, as the discharge amount equalization unit configured to equalize the amount of concentrated sludge to be discharged per unit time, the shuttering board 36 configured to rotate with the screw shaft 16, and the spiral-shaped opening 37 formed in the shuttering board 36. The opening 37 is formed in such a way that the height t of the shuttering 36a, which is formed from an outer side portion of the shuttering 36a, should gradually decrease toward the rear in the rotation direction at the substantially constant decreasing rate in a predetermined angular range α in the rotation direction, the range α starting at the terminal edge 15a of the screw blade 15. Accordingly, when the screw shaft 16 rotates at the constant speed, the height h of the lowest point of the opening 37 also decreases at the substantially constant decreasing rate with the rotation of the screw shaft 16. Thus, the amount of concentrated sludge to be discharged per unit time also becomes substantially constant. Accordingly, the pulsation of the discharge amount of concentrated sludge is prevented, and the discharge amount of concentrated sludge is equalized. To put it differently, the supply amount, the injection pressure, the properties and the like of the concentrated sludge provided to the screw press 1 are equalized, and thereby, the continuity between the sludge concentration by the rotary concentrator 5 and the compression dewatering by the screw press 1 improves. Accordingly, since the efficiency of the dewatering by the screw press 1 improves, a dewatered cake having a low water content with no variation can be efficiently obtained. Note that no specific restriction is imposed on the aperture of the opening 37 of the shuttering board 36 as long as the shape of the opening 37 of the shuttering board 36 is formed in a way that: the radially outer opening edge 37d has a substantially spiral shape; and the height of the lowest point of the opening 37 gradually decreases with rotation of the screw shaft 16.

A performance test of the concentrator-integrated screw press S1 of the present embodiment was conducted. Using two types of digestive sludge having the properties shown in Table 1 below, concentration and dewatering is performed by each of the concentrator-integrated screw press S1 and a conventional high-efficiency screw press as a comparison example. Then, the water contents (% W.B.) and the processed amounts (kg/h) of the obtained cakes were compared.

TABLE 1

|  |  | gravitationally-concentrated digestive sludge | Mechanically-concentrated digestive sludge |
|---|---|---|---|
| Properties of sludge | TS % | Equivalent to 1.0% | Equivalent to 1.5% |
|  | VTS % | 69 | 67 |
|  | Fiber % | 9 | 5 |

The result of the comparison using gravitationally-concentrated digestive sludge in Table 1 is shown in FIG. 11A, while the result of the comparison using mechanically-concentrated digestive sludge in Table 1 is shown in FIG. 11B. It can be seen that the concentrator-integrated screw press S1 exhibited a better performance than the conventional high-efficiency screw press in the both types of digestive sludge. To put it more specifically, the concentrator-integrated screw press S1 is capable of obtaining a cake having a lower water content under the condition of the same processed amount, and is capable of obtaining a larger processed amount under the condition of the same water content.

Modification Example

Figure 12:
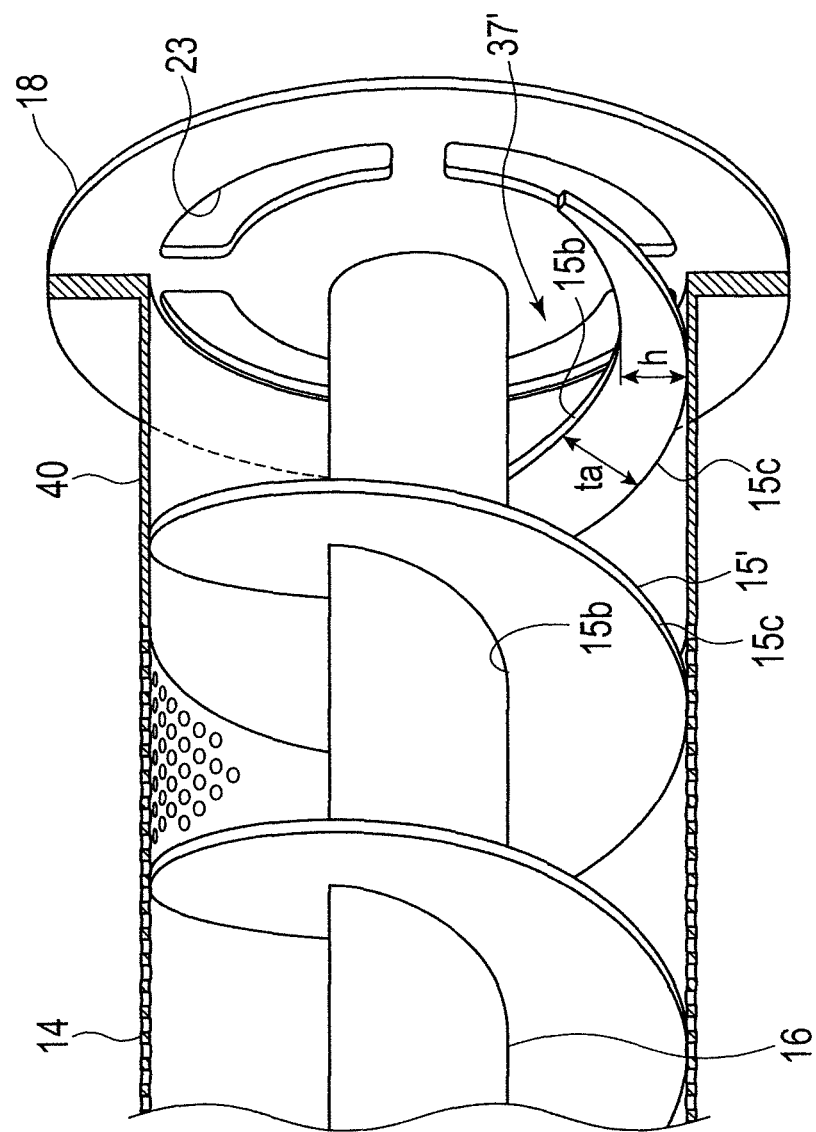
FIG. 12 is a perspective view showing a configuration of a discharge amount equalization unit of the concentrator of a modification example of the first embodiment.

FIG. 12 is a perspective view showing a configuration of the discharge amount equalization unit of the concentrator of a modification example of the first embodiment. The discharge amount equalization unit of the first embodiment includes the shuttering board 36 and the spiral-shaped opening 37, which rotate with the screw shaft 16. However, as shown in FIG. 11, the discharge amount equalization unit may be configured in such a way that: an opening 37' should be formed on an inner peripheral portion of a screw blade 15'; and the opening width of the opening 37' should be gradually increased toward the discharge side.

In this modification example, a radial inner end edge 15b of the screw blade 15' is separated from the screw shaft 16; the opening 37' is formed between the outer peripheral surface of the screw shaft 16 and the radial inner end edge 15b of the screw blade 15'; and the opening width of the opening 37' (the radial width from the outer peripheral surface of the screw shaft 16 to the radial inner end edge 15b of the screw blade 15') is gradually increased toward the discharge side.

To put it more specifically, as in the case of the shuttering 36a, the screw blade 15' of the modification example is formed in such a way that its height to (the radial width from a radially outer end edge 15c to the radial inner end edge 15b of the screw blade 15') should gradually decrease toward the rear in the rotation direction at a substantially constant decreasing rate in a predetermined angular range α in the rotation direction. When the screw blade 15' is viewed in the center axis direction of the screw shaft 16 from the discharge side thereof to the inlet side thereof (from the right to the left direction in FIG. 12), the shape of the radial inner end edge 15b of the screw blade 15' substantially coincides with the shape of the radially outer opening edge 37d of the spiral-shaped opening 37 of the first embodiment. To put it differently, if a spiral curve drawn by the radial inner end edge 15b of the screw blade 15' is projected to a plane perpendicular to the center axis of the screw shaft 16, the spiral curve substantially coincides with the spiral curve of the radially outer opening edge 37d of the spiral-shaped opening 37.

Accordingly, when the screw shaft 16 rotates at a constant speed, a height h of the lowest point of the radial inner end edge 15b decreases at a substantially constant decreasing rate with the rotation of the screw shaft 16, and the amount of concentrated sludge to be discharged per unit time becomes substantially constant. Thereby, the pulsation of the discharge amount of concentrated sludge is prevented, and the discharge amount of concentrated sludge is equalized. To put it more specifically, the supply amount, the injection pressure, the properties and the like of the concentrated sludge provided to the screw press 1 are equalized, and thereby, the efficiency of the dewatering by the screw press 1 improves. Thus, a dewatered cake having a low water content with no variation can be efficiently obtained.

As described above, this modification example can offer the same effects as does the first embodiment without provision of the shuttering board 36.

Second Embodiment

Figure 13:
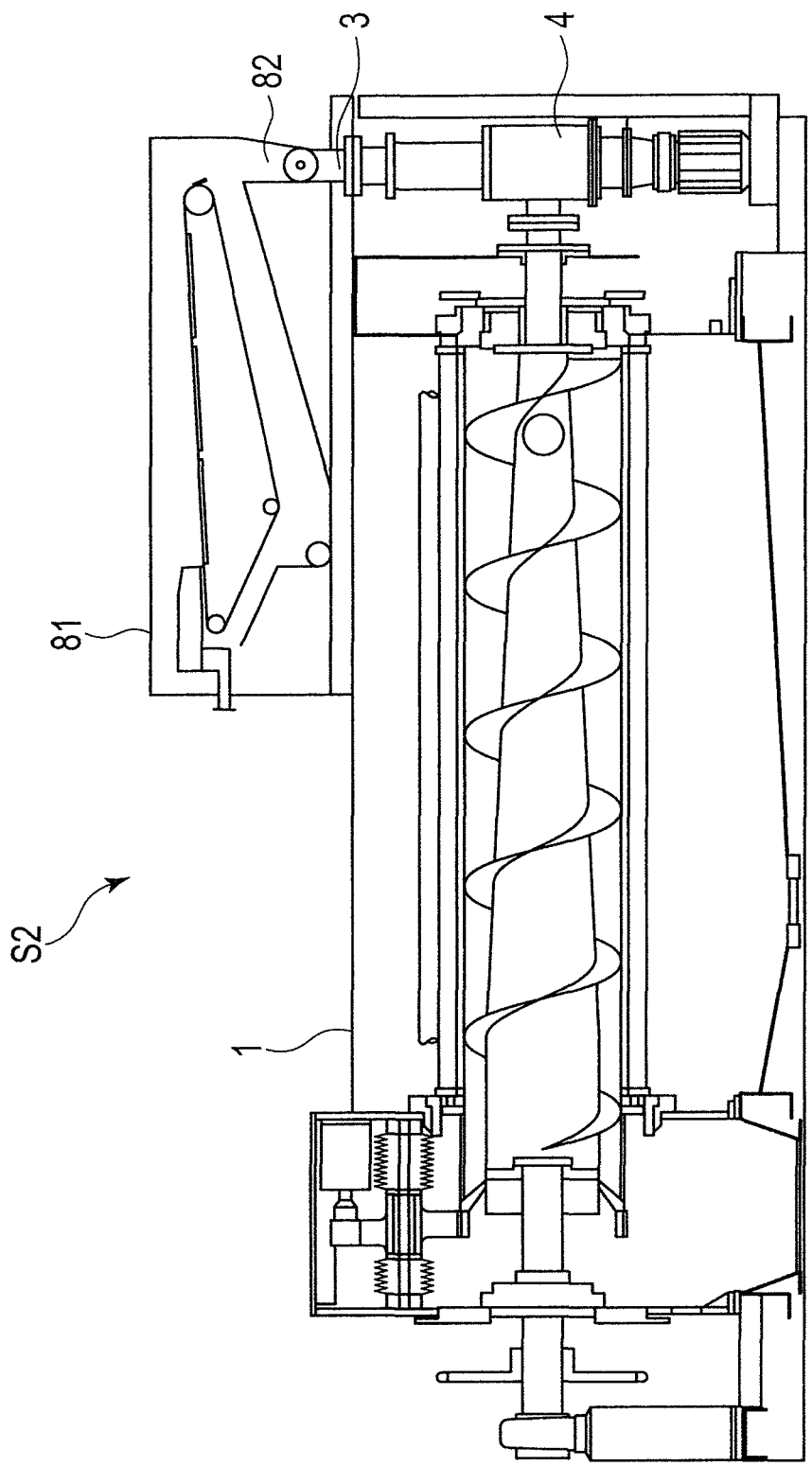
FIG. 13 is a vertical cross-sectional side view of a concentrator-integrated screw press of a second embodiment.

FIG. 13 is a vertical cross-sectional side view of a concentrator-integrated screw press S2 of a second embodiment of the present invention. The concentrator-integrated screw press S2 is different from the first embodiment in that the concentrator-integrated screw press 2 includes the concentrator 2, which is formed from a belt type concentrator 81 and a concentrated sludge storage tank 82, instead of the rotary concentrator 5.

The concentrator-integrated screw press S2 includes: the screw press 1; the belt type concentrator 81 disposed in a stage upstream of the screw press 1; the concentrated sludge storage tank 82 disposed in a discharge unit of the belt type concentrator 81; the chute 3 connected to a discharge portion of the concentrated sludge storage tank 82, and configured to receive the concentrated sludge discharged from the concentrated sludge storage tank 82; and the injection pump 4 vertically provided to a starting end portion of the screw press 1, and configured to inject the concentrated sludge received by the chute 3 into the screw press 1.

Figure 14:
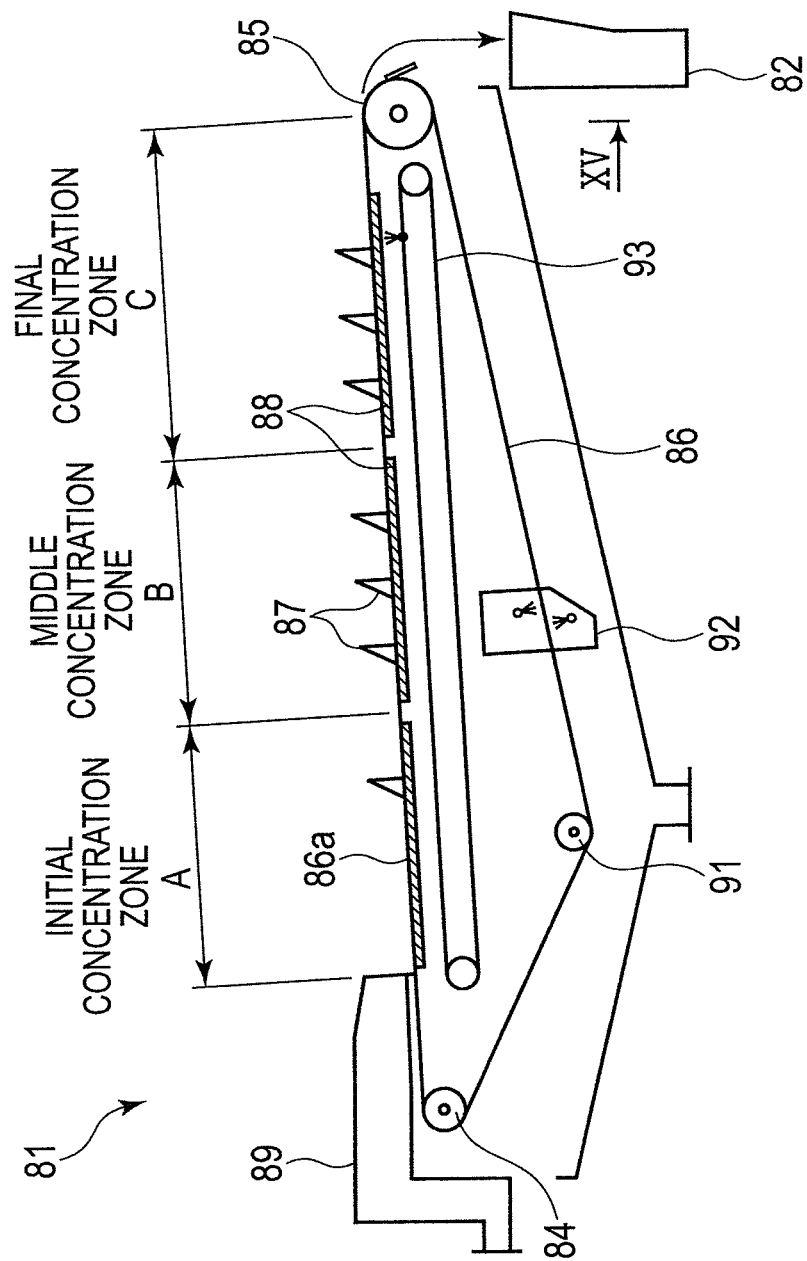
FIG. 14 is a side view of a belt-type concentrator of the second embodiment.

FIG. 14 is a side view of the belt type concentrator 81. The belt type concentrator 81 has a tension roll 84; a drive roll 85; and an endless belt 86 wound around the tension roll 84 and the drive roll 85 in a travelable manner. A filtering surface 86a of the endless belt 86 is disposed in a way that makes the filtering surface 86a form an ascending slope toward the sludge discharge side (the right side in FIG. 14). Multiple plowing units 87 are in sliding contact with the upper surface of the filtering surface 86a, and multiple wedge wires 88 are in sliding contact with the rear surface of the filtrate 86a. Elongated holes are formed in the multiple wedge wires 88 in the traveling direction of the endless belt 86. The filtering surface 86a is partitioned into three zones, which include an initial concentration zone A, a middle concentration zone B and a final concentration zone C in this order from the sludge supply side (the left side in FIG. 14) toward the sludge discharge side, by sequentially reducing the elongated holes in diameter or width toward the discharge side.

The belt type concentrator 81 performs solid-liquid separation by supplying the flocculated and conditioned sludge from a sludge-feeding device 89 to the initial concentration zone A of the endless belt 86. The plowing units 87 are in sliding contact with the filtering surface 86a of the endless belt 86, and thus renew the filtering surface 86a by scraping off the concentrated sludge while overturning the concentrated sludge on the filtering surface 86a. Thereby, the concentrated sludge is overturned, and placed again on the renewed filtering surface 86a while the sludge surface having a high water content faces downward. Thus, the concentration density is improved by the overturning effect and the plowing effect. When the endless belt 86 is turned upside down by the drive roll 85, the concentrated sludge is discharged into the concentrated sludge storage tank 82. Note that a meander correction unit 91 and a belt cleaning unit 92 are provided to an overturned portion of the endless belt 86. A wedge cleaning unit 93 is provided under the wedge wires 88. Note that as a belt type concentrator, one in which a filtering surface having multiple opening holes is made of multiple metal wire materials disposed adjacent to one another is also publicly known.

Figure 15:
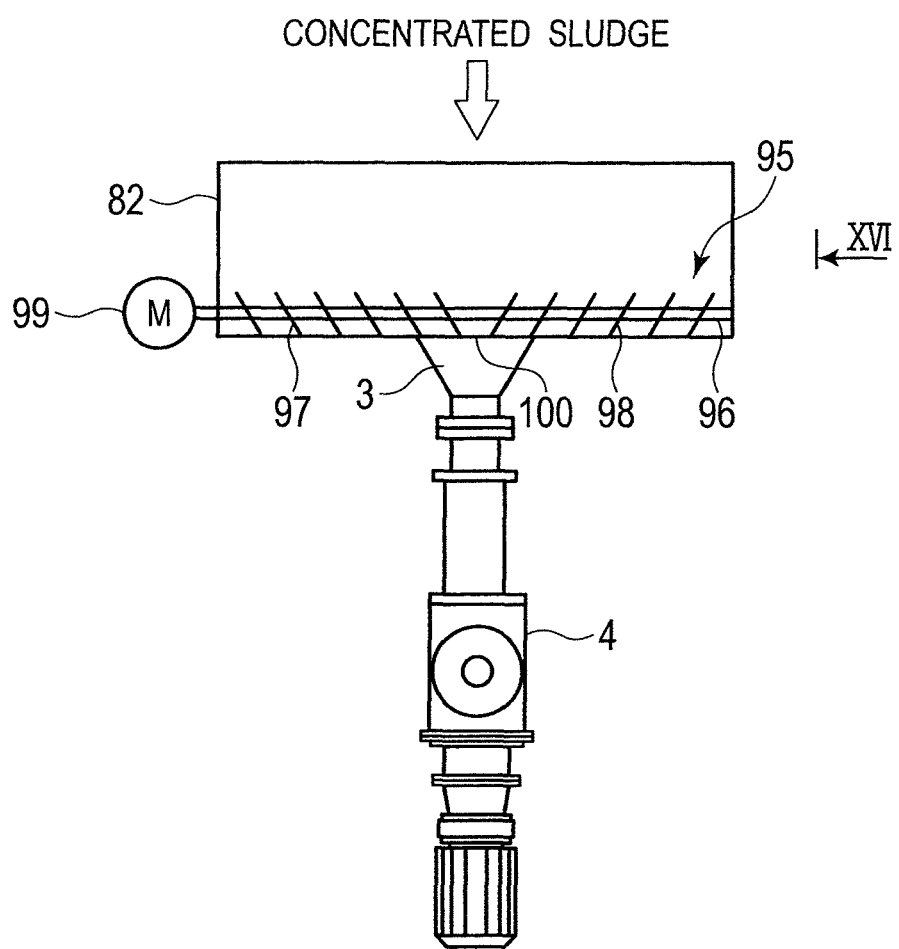
FIG. 15 is a fragmentary view taken in the direction of the arrow XV in FIG. 14, and is a side view of a concentrated sludge storage tank configured to receive concentrated sludge discharged from the belt type concentrator of the second embodiment.
Figure 16:
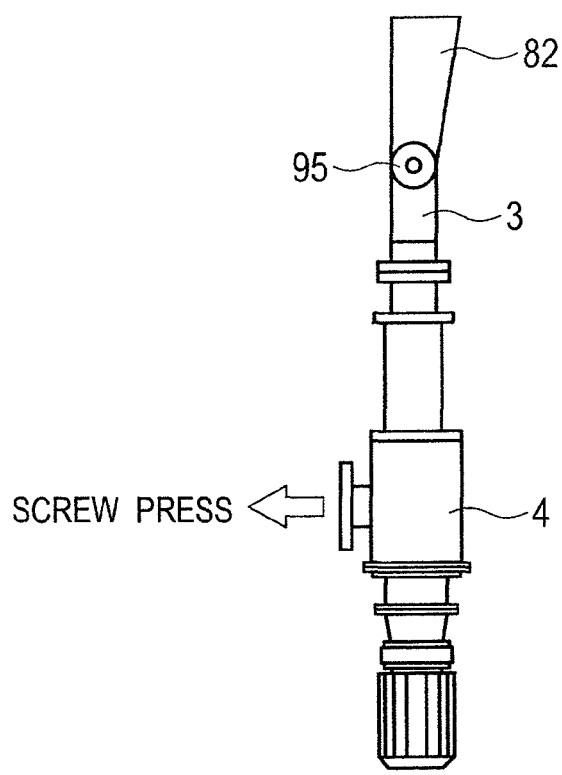
FIG. 16 is a fragmentary view taken in the direction of the arrow XVI in FIG. 15.

FIG. 15 is a side view of the concentrated sludge storage tank 82 configured to receive the concentrated sludge discharged from the belt type concentrator 81, and corresponds to a fragmentary view in the direction of the arrow XV in FIG. 14. FIG. 16 is a fragmentary view in the direction of the arrow XVI in FIG. 15. The concentrated sludge storage tank 82 is disposed under the discharge portion of the belt type concentrator 81 configured to overturn the endless belt 86 by use of the drive roll 85. The concentrated sludge storage tank 82 has a substantially rectangular box shape in a plan view, and a substantially funnel shape in a side view. A sludge corrector 95 is provided in the concentrated sludge storage tank 82. The sludge corrector 95 includes: a drive shaft 96 horizontally provided in the longitudinal direction of the tank bottom of the concentrated sludge storage tank 82; a pair of screw blades 97, 98 wound around the drive shaft 96 in their respective directions opposite to each other; and a drive unit 99 connected to the drive shaft 96. The concentrated sludge spread over the entire width of the endless belt 86 falls from the endless belt 86 and discharged into the concentrated sludge storage tank 82, when the endless belt 86 is overturned by the drive roll 85. The concentrated sludge discharged into the concentrated sludge storage tank 82 is scrapingly corrected to the center portion of the tank bottom while being crushed by the sludge corrector 95.

As shown in FIG. 15, a discharge port 100 is opened in the center portion of the tank bottom of the concentrated sludge storage tank 82, and the chute 3 has a substantially funnel shape in a front view and a substantially rectangular shape in the side view is attached to the discharge port 100. The concentrated sludge scrapingly corrected to the center portion of the tank bottom while crushed by the sludge corrector 95 is pushed into the chute 3 by the sludge corrector 95, and is then supplied to the inlet port 48 of the vertically provided uniaxial screw pump 4. The sludge corrector 95 controls the rotation direction and the number of rotations of the screw blades 97, 98 through the control of the rotation direction and the number of rotations of the drive unit 99 by a controller (not shown), and thereby equalizes the discharge amount of concentrated sludge to be discharged from the discharge port 100 to the chute 3 per unit time. Thus, the concentrator-integrated screw press S2 can obtain the same effects as does the concentrator-integrated screw press S1. To put it more specifically, the discharge amount of concentrated sludge to be discharged from the concentrator per unit time is equalized. Thereby, the supply amount, the injection pressure, the properties and the like of the concentrated sludge provided to the screw press 1 via the uniaxial screw pump 4 are equalized, and the efficiency of the dewatering by the screw press 1 thus improves. For this reason, a dewatered cake having low water content with no variation can be efficiently obtained.

In addition, the present embodiment enables even highly-concentrated sludge having a density of at least 4% and having a low fluidity to be pushed into the chute 3 while crushed by the sludge corrector 95, and then to be continuously injected into the screw press 1 by the uniaxial screw pump 4. Thus, the efficiency of the dewatering by the screw press 1 can be improved.

Furthermore, the present embodiment enables the sludge to be compressed and dewatered by the screw press 1 immediately after concentrated by the belt type concentrator 81, since the belt type concentrator 81 and the concentrated sludge storage tank 82 are directly connected to the screw press 1 via the uniaxial screw pump 41. The concentrated sludge no longer has to be left in the storage tank for a long time. Accordingly, the phenomenon that the dewatering efficiency decreases due to a progress in the decomposition of sludge does not occur. To put it more specifically, the concentrator-integrated screw press S2 of the present embodiment is capable of improving the dewatering efficiency without causing the decomposition or something similar in the concentrated sludge, because the concentrator-integrated screw press 1 dewaters the sludge immediately after the sludge is concentrated as a result of directly connecting the belt type concentrator 81 and the concentrated sludge storage tank 82 to the screw press 1 together.

Moreover, the concentrated sludge with no pulsation can be injected into the screw press 1 while forming strong and homogeneous flocs in the concentrated sludge, because: the inorganic flocculant is added to the concentrated sludge which is discharged from the concentrated sludge storage tank 82; and the concentrated sludge and the inorganic flocculant are mixed and kneaded by the rotor 42 and the mixing impellers 46. To put it differently, the concentrator-integrated screw press S2 of the present embodiment is capable of obtaining a dewatered cake having a low water content by concentrating and dewatering the sludge having a high water content and a high fluidity.

In addition, the concentrator-integrated screw press S2 of the present embodiment does not need a large installation area for the concentrator, the concentrated sludge storage tank or the dewatering system. Thus, the concentrator-integrated screw press S2 makes the installation area significantly smaller than the installation area needed for the conventional system obtained by combination of a concentrator and a dewatering device, and achieves space-saving.

The embodiments described above are presented as examples only for the purpose of making the present invention understood easily. The present invention is not limited to these embodiments, and various modifications and changes may be made within the technical scope of the present invention. For example, a rotary cylinder concentrator, a centrifugal concentrator, a multiple-disk outer cylinder concentrator, a rotary circular disk concentrator and something similar may be used as the concentrator in addition to the rotary concentrator of the first embodiment and what is obtained by integrating the belt type concentrator and the concentrated sludge storage tank in the second embodiment.

Figure 17:
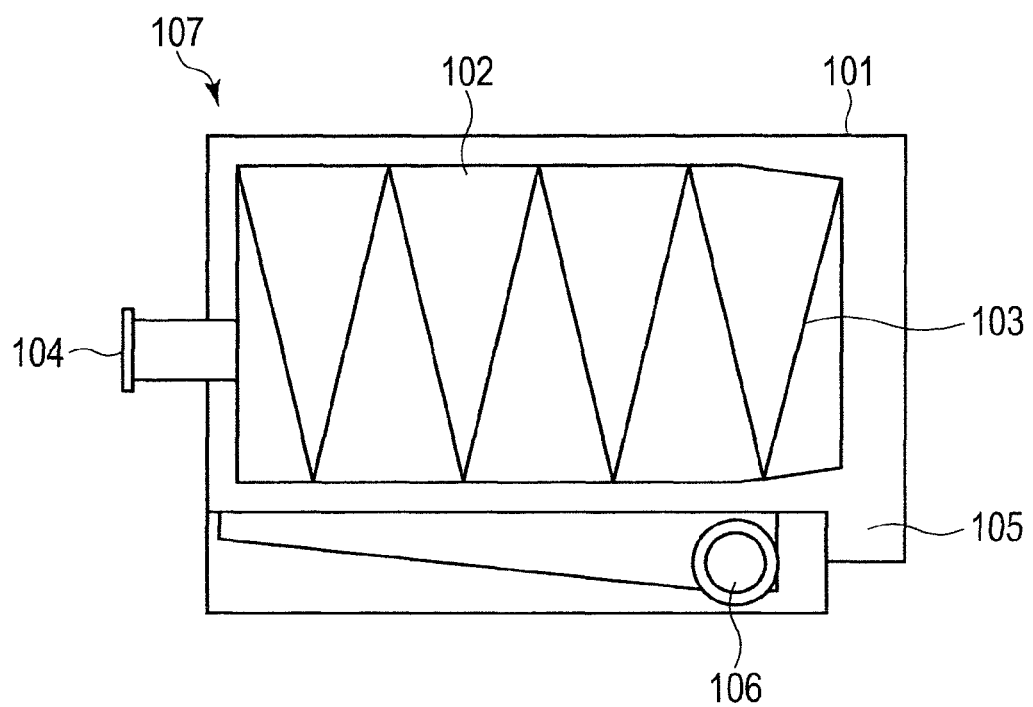
FIG. 17 is a vertical cross-sectional view of a rotary drum-type concentrator which shows an example of a rotary cylindrical concentrator.

As the rotary cylinder concentrator, a rotary drum concentrator 107 may be considered, for example. In the rotary drum concentrator 107, as shown in FIG. 17, a cylindrical spiral 103 is provided in a drum screen 102 disposed inside a casing 101. In addition, a sludge inlet port 104 is provided to one end of the drum screen 102 while a sludge discharge port 105 is provided to the other end thereof. Moreover, a separator liquid discharge port 106 is disposed at a downstream side of the casing 101.

Figure 18:
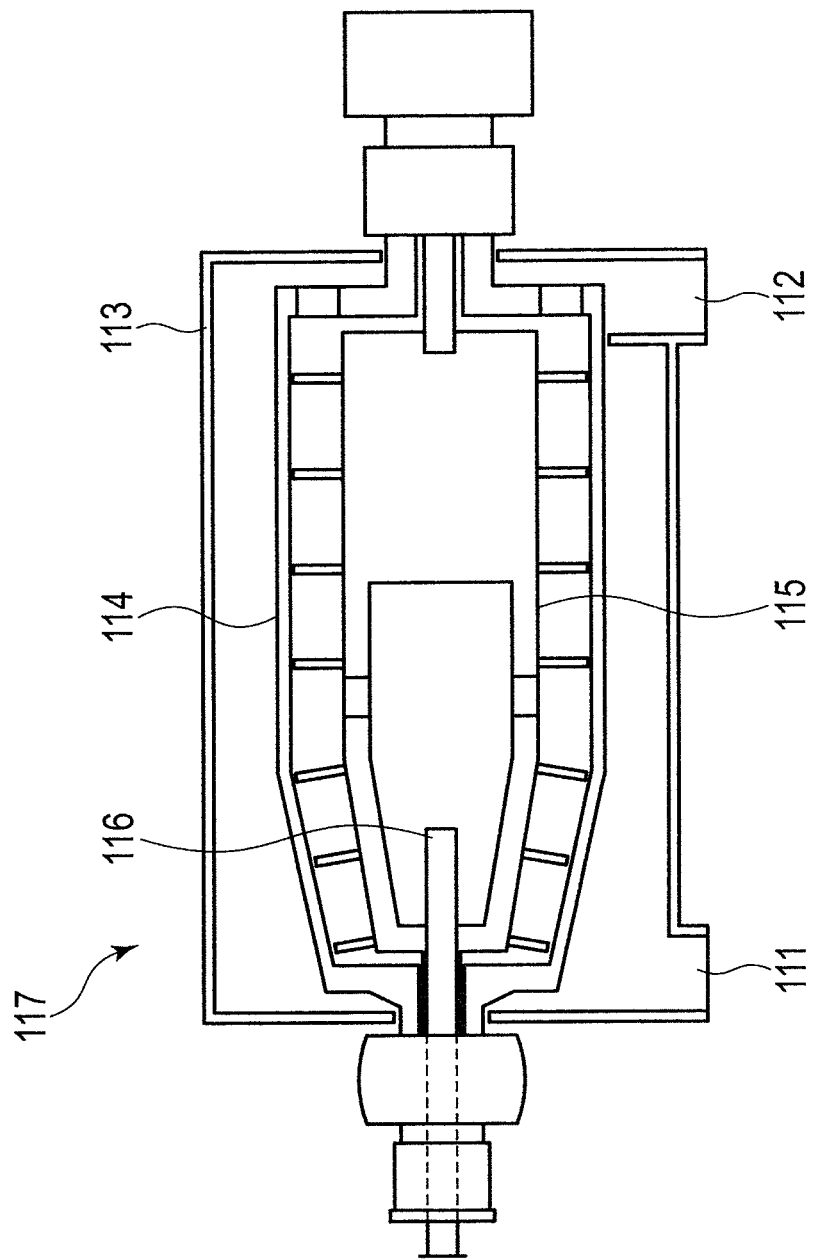
FIG. 18 is a vertical cross-sectional view of a centrifuge separator, which shows an example of a centrifugal concentrator.

As the centrifugal concentrator, a centrifugal separator 117 may be considered, for example. In the centrifugal separator 117, as shown in FIG. 18, a bowl 114 having a rotary cylindrical body is provided in a casing 113 having a heavy component outlet 111 and a light component outlet 112. In addition, a screw conveyer 115 for differential speed rotation is provided in the bowl 114. Moreover, a supply nozzle 116 for a treatment target liquid is provided to a body part of the screw conveyer 115.

Figure 19:
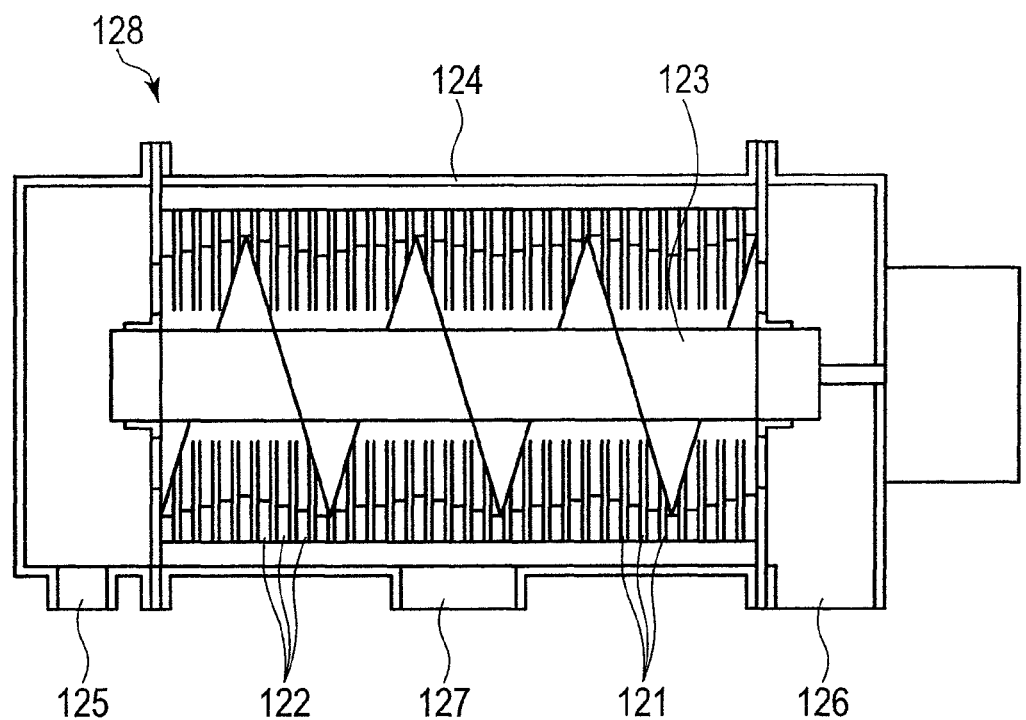
FIG. 19 is a vertical cross-sectional view of a solid-liquid separator, which shows an example of a multiple-disk outer cylindrical concentrator.

As the multiple-disk outer cylinder concentrator, for example, a screw press shaped solid-liquid separator 128 may be considered. In the screw press shaped solid-liquid separator 128, as shown in FIG. 19, a solid-liquid separation unit in which a screw conveyer 123 is disposed inside a cylindrical body formed of multiple fixture rings 121 and floating rings 122 is disposed at a center portion inside a casing 124. In addition, an inflow port 125 for sludge water is formed in a lower left portion of the casing 124, and a discharge port 126 for solid components is formed in a lower right portion of the casing 124. Moreover, a discharge port 127 for separation water is formed in a lower center portion of the casing 124.

Figure 20:
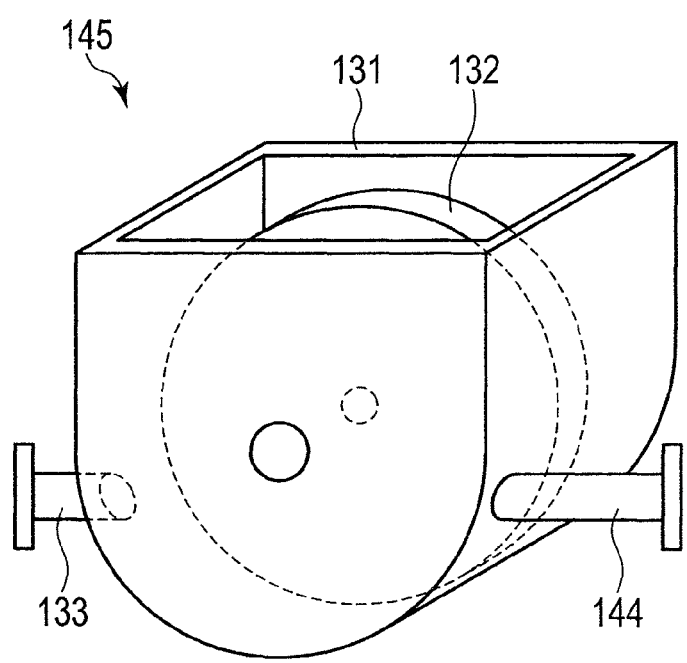
FIG. 20 is a vertical cross-sectional view of a continuous concentrator, which shows an example of a rotary disk-type concentrator.

Furthermore, as the rotary circular disk concentrator, for example, a sludge concentrator 145 may be considered. In the sludge concentrator 145, as shown in FIG. 20, a rotatable honeycomb screen 132 is disposed in a concentration tank 131. In addition, a supply port 133 for sludge to form flocs is provided to one of side portions of the concentration tank 131, and a discharge port 144 for concentrated sludge is provided to the other one of the side portions thereof.

Moreover, although the outer cylinder screen 50 of the screw press 1 is configured to rotate by the outer cylinder drive unit 57, which can perform forward and reverse rotation, in the aforementioned embodiments, the outer cylinder screen may be of a fixed type.

Figure 21:
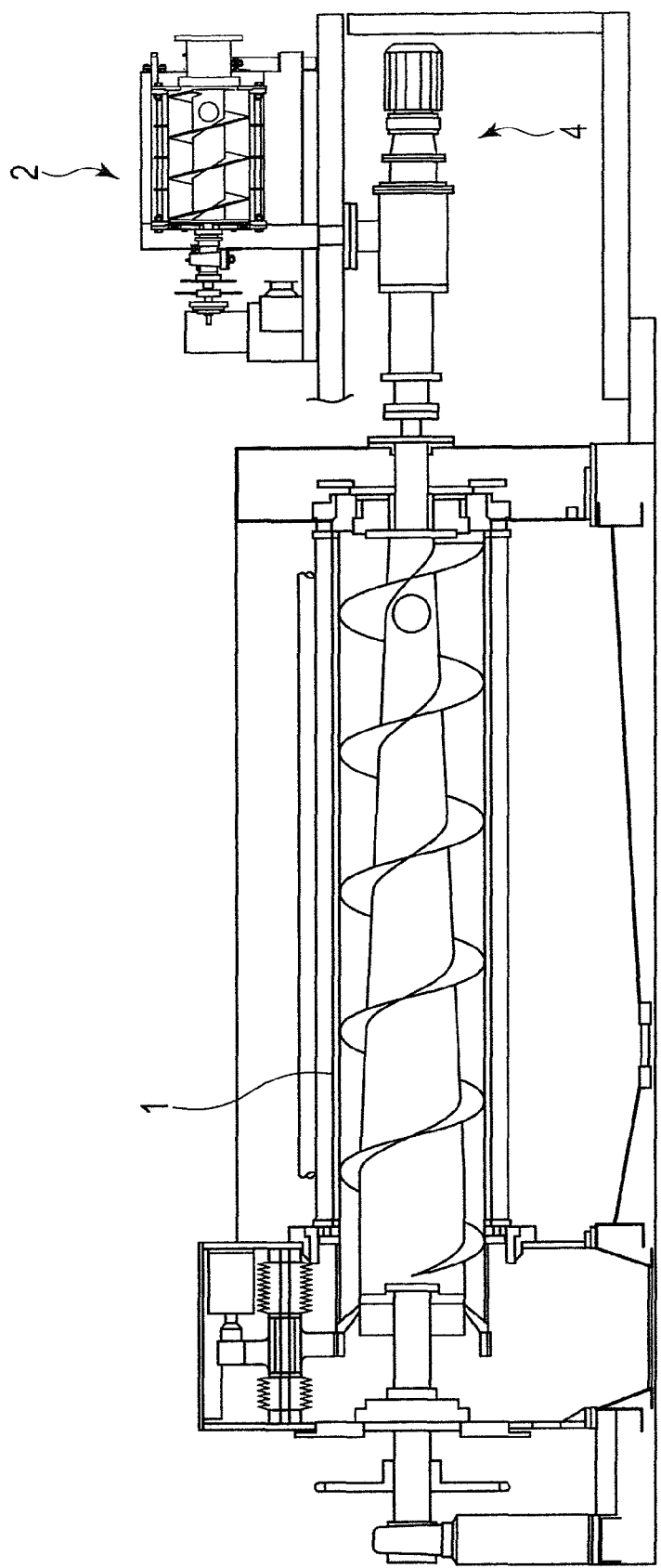
FIG. 21 is a vertical cross-sectional side view of a concentrator-integrated screw press, which shows an example in which a concentrator is disposed at an inlet side of a screw press.
Figure 22:
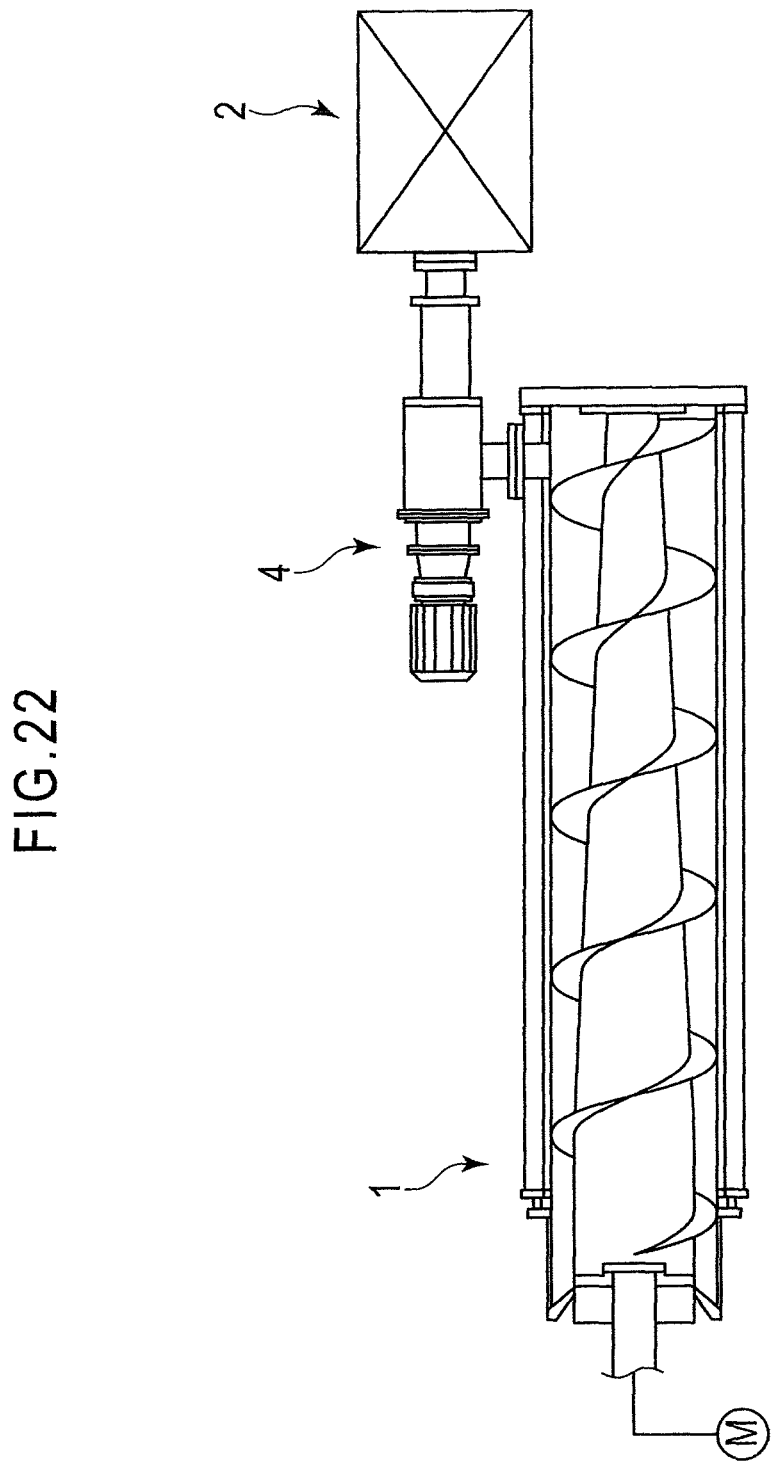
FIG. 22 is a plan view of a concentrator-integrated screw press, which shows an example in which a concentrator is connected to a side surface of a screw press of an outer cylinder screen fixed type via an injection pump.

In addition, although the various types of the concentrators are installed respectively on top of the screw presses in the aforementioned embodiments, the concentrators do not have to be placed on such positions. As shown in FIG. 21, the concentrator 2 may be placed in an inlet side of the screw press 1. Further, as shown in FIG. 22, the concentrator 2 may be connected to a side surface of the screw press 1 of an outer cylinder fixed type via the injection pump 4.

This application is based upon and claims the benefit of priority from the prior Japanese Patent Application No. 2009-067380 filed on Mar. 19, 2009 and Japanese Patent Application No. 2009-226833 filed on Sep. 30, 2009; the entire contents of which are incorporated herein by reference.

INDUSTRIAL APPLICABILITY

The concentrator-integrated screw presses of the present invention include the discharge amount equalization, unit configured to equalize the amount of concentrated sludge to be discharged per unit time. Thus, the supply amount, the injection pressure, the properties and the like of the concentrated sludge supplied to each of the screw presses are equalized, and thereby, the continuity between the sludge concentration by the concentrator and the compression dewatering by the screw press improves. Thereby, the efficiency of the dewatering by the screw press improves, and a dewatered cake having low water content with no variation can be efficiently obtained.

If the concentrator-integrated screw press of the present invention is installed in facilities for treating sewage, human excrement, rural drainage, and waste water of factories and the like, the concentrator-integrated screw press can be a space saving concentration dewatering system.

The invention claimed is:

1. A concentrator-integrated screw press comprising:
a continuous concentrator configured to continuously concentrate sludge and discharge the sludge as concentrated sludge, and including a discharge amount equalization unit configured to equalize an amount of concentrated sludge to be discharged per unit time;
a positive displacement pump installed consecutively to the concentrator, and configured to continuously transport the concentrated sludge discharged from the concentrator; and
a screw press installed consecutively to a discharge side of the positive displacement pump, and configured to compress and dewater the concentrated sludge.

2. The concentrator-integrated screw press of claim 1, wherein
the concentrator is a rotary concentrator which includes:
an outer cylinder screen; and
a screw shaft which is configured to rotate in the outer cylinder screen, and around which a screw blade is wound spirally, and
the discharge amount equalization unit includes:
a shuttering board configured to rotate together with the screw shaft; and
an opening formed in the shuttering board, having a substantially spiral shape.

3. The concentrator-integrated screw press of claim 2, wherein the opening of the shuttering board is formed in such a way that a height of the lowest point of the opening gradually decreases with rotation of the screw shaft.

4. The concentrator-integrated screw press of claim 2, wherein the opening of the shuttering board is formed in such a way that a radially outer opening edge of the opening gradually comes closer to an outer peripheral edge of the shuttering board toward the rear in the rotation direction in a predetermined angular range in the rotation direction of the screw shaft, the range starting at a blade terminal edge of the screw blade.

5. The concentrator-integrated screw press of claim 1, wherein
the concentrator is a rotary concentrator which includes:
an outer cylinder screen; and
a screw shaft which is configured to rotate in the outer cylinder screen, and around which a screw blade is wound spirally, and
the discharge amount equalization unit is configured in such a way that: an opening is formed in an inner peripheral portion of the screw blade; and an opening width of the opening is gradually increased toward a discharge side.

6. The concentrator-integrated screw press of claim 5, wherein the opening of the screw blade is formed in such a way that a height of the lowest point of the opening gradually decreases with rotation of the screw shaft.

7. The concentrator-integrated screw press of claim 5, wherein the opening of the screw blade is formed by separating a radial inner end edge of the screw blade from the screw shaft.

8. The concentrator-integrated screw press of claim 2, wherein
a chemical supply pipe is disposed inside the screw shaft, and has a plurality of nozzle holes opened toward a terminal end portion of a concentrating compartment defined and formed between the outer cylinder screen and the screw shaft, and
an impermeable annular cylinder is provided to an area in the outer cylinder screen corresponding to a last pitch of the screw blade.

9. The concentrator-integrated screw press of claim 1, wherein
the concentrator is a belt type concentrator, and
the discharge amount equalization unit includes:
a concentrated sludge storage tank connected consecutively to a discharge portion of the belt type concentrator; and
a sludge corrector including: a drive shaft horizontally disposed in a tank bottom portion of the concentrated sludge storage tank, a pair of screw blades wound around the drive shaft in their respective directions opposite to each other, and a drive unit connected to the drive shaft.

10. The concentrator-integrated screw press of claim 1, wherein
the positive displacement pump includes a uniaxial screw pump, and
the uniaxial screw pump includes a rotor and a casing including the rotor disposed therein, and
the casing has a suction port opened in one end side thereof, and an injection chamber formed by expanding another end side thereof, and
a discharge port connected to the screw press is formed in a sidewall of the injection chamber.

11. The concentrator-integrated screw press of claim 10, wherein
a polyferric sulfate supply pump is connected to a connection part between the concentrator and the positive displacement pump, and
a mixing impeller is fixedly attached to a rotor drive shaft provided extending in the injection chamber of the uniaxial screw pump and configured to drive the rotor.

12. The concentrator-integrated screw press of claim 10, wherein a plurality of discharge ports are formed in the injection chamber of the uniaxial screw pump, and a plurality of screw presses are connected to the plurality of discharge ports, respectively.

13. The concentrator-integrated screw press of claim 1, wherein the concentrator is provided on top of or lateral to the screw press.

* * * * *